(12) United States Patent
Kojima et al.

(10) Patent No.: US 8,749,464 B2
(45) Date of Patent: Jun. 10, 2014

(54) DISPLAY DEVICE, AND METHOD OF OPERATION THEREOF

(71) Applicant: Semiconductor Energy Laboratory Co., Ltd., Atsugi (JP)

(72) Inventors: Yu Kojima, Atsugi (JP); Yuko Tachimura, Atsugi (JP); Shunpei Yamazaki, Setagaya (JP); Yoshifumi Tanada, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 13/681,906

(22) Filed: Nov. 20, 2012

(65) Prior Publication Data

US 2013/0076775 A1    Mar. 28, 2013

Related U.S. Application Data

(62) Division of application No. 11/291,787, filed on Dec. 2, 2005, now Pat. No. 8,319,714.

(30) Foreign Application Priority Data

Dec. 22, 2004  (JP) ................................. 2004-371732
Apr. 15, 2005  (JP) ................................. 2005-118530

(51) Int. Cl.
*G09G 3/36* (2006.01)

(52) U.S. Cl.
USPC ................................. 345/89; 345/87; 345/589

(58) Field of Classification Search
USPC .................................................... 345/87–104
See application file for complete search history.

(56) References Cited

U.S. PATENT DOCUMENTS 5,832,123 A  *  11/1998  Oyamada ...................... 382/237
5,896,575 A  *   4/1999  Higginbotham et al. ..... 455/566

(Continued)

FOREIGN PATENT DOCUMENTS

CA      1539128      10/2004
CN      1375814      10/2002

(Continued)

OTHER PUBLICATIONS

Office Action (Application No. 200510138137.4) dated May 30, 2008.

*Primary Examiner* — Alexander Eisen
*Assistant Examiner* — Robin Mishler
(74) *Attorney, Agent, or Firm* — Eric J. Robinson; Robinson Intellectual Property Law Office, P.C.

(57) ABSTRACT

It is an object of the invention to provide a display device which performs high grayscale display in accordance with display contents and a game machine with an improved realistic sensation. The invention is a display device characterized by including a pixel portion which performs display based on a video signal and a driver circuit portion inputted with the video signal, wherein the driver circuit portion has a unit for controlling a grayscale in accordance with display of the pixel portion. In a liquid crystal display device, luminance of a lighting unit is controlled based on a signal from the unit for controlling a grayscale whereas a current supplied to a light emitting element is controlled in a light emitting device. By applying such a display device to a game machine, a realistic sensation can be improved.

20 Claims, 16 Drawing Sheets

(56) References Cited

U.S. PATENT DOCUMENTS

| | | | |
|---|---|---|---|
| 6,005,636 A * | 12/1999 | Westerman | 348/571 |
| 6,201,592 B1 | 3/2001 | Terashita et al. | |
| 6,329,964 B1 | 12/2001 | Tanaka | |
| 6,633,273 B2 | 10/2003 | Ikeda et al. | |
| 6,795,053 B1 | 9/2004 | Funamoto et al. | |
| 6,839,048 B2 | 1/2005 | Park | |
| 6,964,607 B2 | 11/2005 | Sasaki | |
| 7,050,037 B1 | 5/2006 | Kuramatsu | |
| 7,265,743 B2 | 9/2007 | Funamoto et al. | |
| 7,268,757 B2 | 9/2007 | Ben-David et al. | |
| 7,268,759 B2 | 9/2007 | Hsu | |
| 7,277,103 B2 | 10/2007 | Kurumisawa et al. | |
| 7,289,087 B2 | 10/2007 | Date | |
| 7,394,449 B2 | 7/2008 | Moon | |
| 7,414,608 B2 | 8/2008 | Funamoto et al. | |
| 2002/0033783 A1 | 3/2002 | Koyama | |
| 2002/0154077 A1 | 10/2002 | Wakita | |
| 2003/0030610 A1 | 2/2003 | Yamada | |
| 2003/0063053 A1 | 4/2003 | Yamazaki et al. | |
| 2003/0071804 A1 | 4/2003 | Yamazaki et al. | |
| 2003/0127651 A1 * | 7/2003 | Murakami et al. | 257/72 |
| 2003/0179211 A1 | 9/2003 | Wada et al. | |
| 2004/0017343 A1 | 1/2004 | Adachi et al. | |
| 2004/0183082 A1 | 9/2004 | Yamazaki | |
| 2005/0122294 A1 | 6/2005 | Ben-David et al. | |
| 2005/0174320 A1 | 8/2005 | Park | |
| 2005/0248697 A1 | 11/2005 | Ukawa | |
| 2008/0024410 A1 | 1/2008 | Ben-David et al. | |
| 2008/0030447 A1 | 2/2008 | Ben-David et al. | |
| 2008/0192178 A1 | 8/2008 | Ben-David et al. | |

FOREIGN PATENT DOCUMENTS

| | | |
|---|---|---|
| CN | 1543282 | 11/2004 |
| EP | 1 111 578 A | 6/2001 |
| EP | 1 283 515 | 2/2003 |
| EP | 1 473 694 | 11/2004 |
| EP | 2 071 551 A | 6/2009 |
| JP | 08-320454 | 12/1996 |
| JP | 2001-252474 | 9/2001 |
| JP | 2001-306035 | 11/2001 |
| JP | 2002-055664 A | 2/2002 |
| JP | 2002-244615 A | 8/2002 |
| JP | 2003-058122 | 2/2003 |
| JP | 2003-259154 A | 9/2003 |
| JP | 2003-280579 A | 10/2003 |
| JP | 2005-316110 A | 11/2005 |
| WO | WO 02/101644 | 12/2002 |
| WO | WO 03/088203 | 10/2003 |

* cited by examiner

DISPLAY DEVICE, AND METHOD OF OPERATION THEREOF

TECHNICAL FIELD

The invention relates to a display device which enables high grayscale display in accordance with display contents, and to an operating method thereof.

BACKGROUND ART

A conventional display device, in particular a display portion of a game machine employs a flat panel. As a flat panel, there is a panel (a liquid crystal panel) including liquid crystal elements. Such a game machine is devised to improve display images and sounds in order to improve the realistic sensation felt by a user. For example, a game machine using a reflective type liquid crystal panel is suggested in which brightness of a character and a background is controlled separately (see Patent Document 1).

Patent Document 1

Japanese Patent Application Laid-Open No. 2003-58122

DISCLOSURE OF INVENTION

The aforementioned Patent Document 1 discloses that luminance of a panel is controlled in accordance with the ambient brightness when used in an environment with a fluorescent lamp or natural light. However, control in accordance with display contents of a screen is not considered.

In view of this, the invention provides a game machine with a simple structure, which enhances a display function by controlling the luminance in accordance with display contents, in specific, which provides a realistic sensation.

In view of the aforementioned, the invention is characterized by enhancing the luminance of a region which displays a high grayscale in one screen (hereinafter, the display is referred to as a high grayscale display and the region is referred to as a high grayscale region) in accordance with display contents.

In specific, the invention is a display device characterized by having a pixel portion which performs display based on video signals and a driver circuit portion to which the video signals are inputted, wherein the driver circuit portion includes a unit for controlling a grayscale so that the highest grayscale is different in accordance with display of the pixel portion.

Another mode of the invention is a display device characterized by having a pixel portion including a light emitting element which performs display based on video signals and a driver circuit portion inputted with the video signals, wherein the driver circuit portion includes a circuit for controlling the grayscale of the video signals so that the highest grayscale is different in accordance with display of the pixel portion.

Another mode of the invention is a display device characterized by having a pixel portion which performs display based on video signals, a lighting unit which supplies light to the pixel portion, and a driver circuit portion which is inputted with the video signal and controls the lighting unit, wherein the driver circuit portion includes a circuit for controlling light emission intensity of the lighting unit so that the highest grayscale is different in accordance with display of the pixel portion.

Another mode of the invention is a display device characterized by having a pixel portion including a light emitting element which performs display based on video signals and a driver circuit portion to which the video signals are inputted, wherein the driver circuit portion includes a control circuit for controlling light emission intensity of the light emitting element in accordance with display of a first region of the pixel portion and light emission intensity of the light emitting element in accordance with display of a second region thereof; and wherein the highest grayscale is different between the first region and the second region.

Another mode of the invention is a display device characterized by having a pixel portion which performs display based on a video signal, a lighting unit which supplies light to the pixel portion, and a driver circuit portion which is inputted with the video signal and controls the lighting unit, wherein the driver circuit portion includes a control circuit which controls light emission intensity of the lighting unit in accordance with display of a first region of the pixel portion and alignments of liquid crystals in accordance with display of a second region; and wherein the highest grayscale is different between the first region and the second region.

Another mode of the invention is an operating method of a display device including a pixel portion which performs display based on a video signal, a driver circuit portion inputted with the video signal, and a control circuit for controlling a grayscale in accordance with display of the pixel portion in the driver circuit portion, wherein the video signal is inputted to a frame memory included in the control circuit; wherein video signals for one frame are stored in the frame memory; wherein a process is carried out by a determining circuit included in the control circuit to determine a ratio of a high grayscale region to a low grayscale region based on the video signals; and wherein an addition process to display a high grayscale region at higher luminance or a subtraction process to reduce luminance of an entire screen is carried out based on a result of the determination process.

It is to be noted that a backlight or a front light is used as the lighting unit, for which a cold cathode tube or a diode can be used.

Further, the invention can provide a game machine characterized by using the aforementioned display device.

According to the invention, luminance of a high grayscale region can be raised in accordance with display contents. Further, luminance of a gray display region can also be reduced. As a result, a display device with an enhanced display function can be provided. In specific, a game machine which provides an improved realistic sensation can be provided.

BEST MODE FOR CARRYING OUT THE INVENTION

Figure 1A:
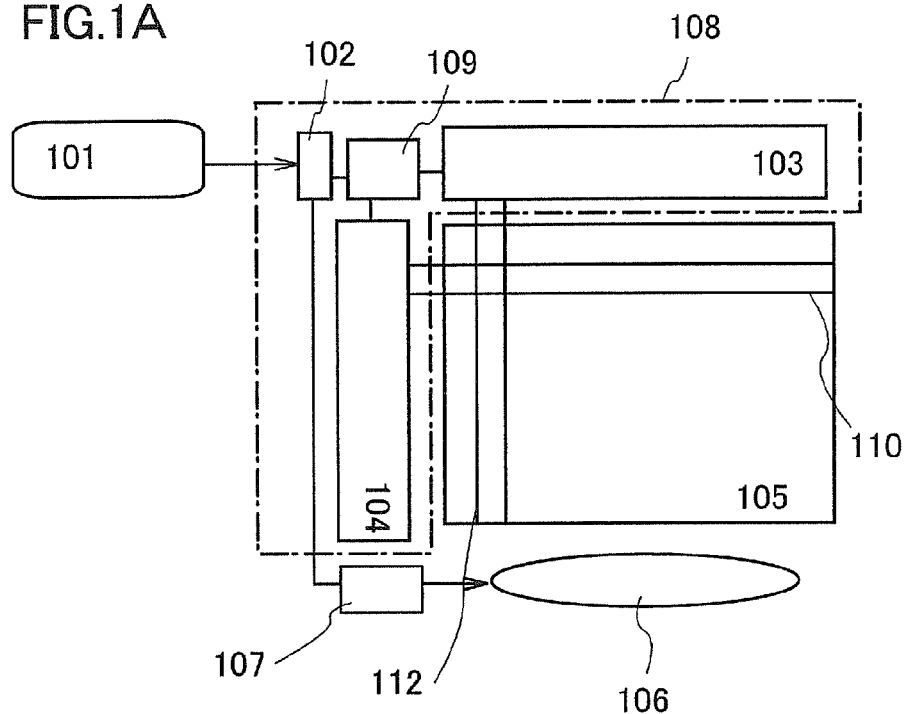
FIGS. 1A to 1C are system diagrams each showing a liquid crystal display device of the invention.

Although the invention will be fully described by way of embodiment modes with reference to the accompanying drawings, it is to be understood that various changes and modifications will be apparent to those skilled in the art. Therefore, unless such changes and modifications depart from the scope of the invention, they should be construed as being included therein. Note that identical portions in embodiment modes are denoted by the same reference numerals and detailed descriptions thereof are omitted.

Figure 4A:
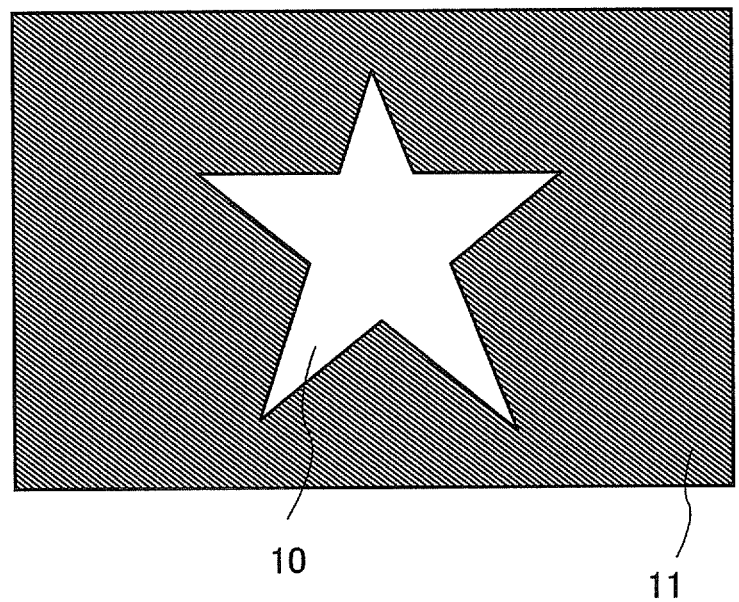
FIGS. 4A and 4B are diagrams each showing a concept of a display device of the invention.

A concept of a display device of the invention is described. For example, as shown in FIG. 4A, in the case where a star 10 is displayed in white at a center of a screen with a background 11 displaying black or gray, the star 10 is displayed at a high grayscale (for example, the highest grayscale with the largest number of grayscale levels) and the background 11 is displayed at a low grayscale (for example, the lowest grayscale with the smallest number of grayscale levels). A white display can stand out depending on a difference between the high grayscale and the low grayscale. In view of this, in the case of a white display, the invention performs a high grayscale display where luminance itself is raised so that the white display stands out.

In the case of enhancing luminance when performing a white display with a display device (liquid crystal display) including liquid crystal elements, luminance of a light source included in a lighting unit is raised. Therefore, a driver circuit portion is controlled so that more current is supplied to the light source. That is, the driver circuit portion of the invention includes a control unit for controlling a grayscale in accordance with display of a liquid crystal display device. It is to be noted at this time that a high luminance display is performed by selecting the liquid crystal elements provided at appropriate places.

In the case of a display device (light emitting device) including a light emitting element, luminance of the light emitting element itself is raised. Therefore, a driver circuit portion is controlled so that more current is supplied to the light emitting element. That is, the driver circuit portion of the invention includes a control unit for controlling a grayscale in accordance with display of the light emitting device. It is to be noted at this time that a high luminance display is performed by selecting the light emitting element provided at appropriate places.

In such invention, a grayscale of a gray display may be controlled as well. For example, if a lot of current is supplied to a light source included in the lighting unit, the grayscale of the gray display is enhanced. To prevent this, the grayscale of the gray display is preferably set low. In specific, the angles of the liquid crystal elements of a region which performs a gray display are controlled so that the light of the light source included in the lighting unit does not easily transmit through. Further, in the case of a light emitting device, a current supplied to a light emitting element is controlled to be small in a region which performs a gray display. The driver circuit portion may include such a unit for controlling the grayscale of the gray display.

Figure 4B:
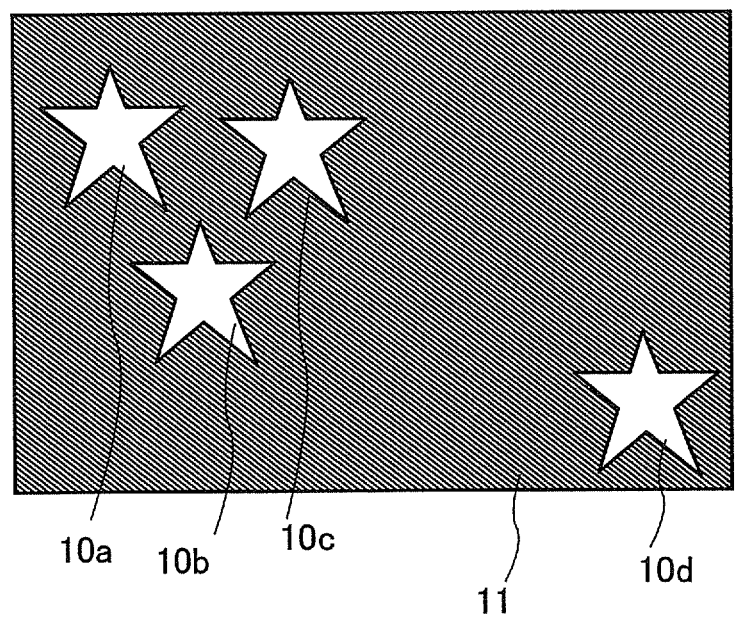

As shown in FIG. 4B, even in the case where a plurality of white stars 10a to 10d are displayed at appropriate places with the background 11 displaying black or gray, the grayscale can be similarly enhanced. In this case, the driver circuit portion can specify the places by video signals where the stars 10a to 10d are displayed. Similarly, when enhancing luminance in displaying white, luminance of a light source of a lighting unit is raised in the case of a liquid crystal display device and luminance of a light emitting element itself is raised in the case of a light emitting device. It is to be noted that the grayscale may be controlled similarly in the case of a gray display.

In this manner, by enhancing a grayscale of a high grayscale (the highest grayscale) by the invention, a display device which can perform display where white stands out can be provided.

It is to be noted that the invention can be applied to a display device other than a liquid crystal display device and a light emitting device, such as a PDP (Plasma Display Panel), an SED (Surface-conduction Electron-emitter Display), an FED (Field Emission Display), and other display devices provided with a light emitting medium.

Further, it is preferable that such a display device be applied to a display portion of a game machine. As a result, a game machine which provides a game with a highly realistic sensation can be provided.

Embodiment Mode 1

In this embodiment mode, description is made on the case where a grayscale is enhanced in accordance with display contents by using a liquid crystal display device.

FIG. 1A is a system block diagram of a pixel portion 105 and a driver circuit portion 108 of a liquid crystal display device. In the pixel portion 105, a signal line 112 and a scan line 110 cross each other.

The pixel portion 105 includes a plurality of pixels and switching elements at intersections of the signal lines 112 and the scan lines 110 which form each pixel. By the switching elements, voltage can be applied to control the angles of liquid crystal molecules. It is to be noted that the pixel portion of the invention is not limited to such an active type, but may have a passive type structure as well. The passive type can be formed by a simple process since each pixel does not have a switching element.

The driver circuit portion 108 includes a control circuit 102, a controller 109, a signal line driver circuit 103, and a scan line driver circuit 104. The control circuit 102 has a function to control a grayscale in accordance with display contents of the pixel portion 105; for example, a function to enhance a grayscale of an appropriate place of the pixel portion 105 in accordance with display contents of the pixel portion 105. In specific, the control circuit 102 inputted with a video signal 101 generates a signal to increase a power supplied to a backlight 106 as a lighting unit, and the signal is inputted to a power source 107 of the backlight 106. It is to be noted that the lighting unit includes a front light besides the backlight. As a result, the backlight 106 emits light at luminance higher than normal; thereby a high grayscale display can be performed.

The controller 109 has a function to input a signal from the control circuit 102 to the signal line driver circuit 103 and the scan line driver circuit 104. It is to be noted that in the case where the backlight 106 emits light at luminance higher than normal as described above, a grayscale of a gray display region which is a region other than a high grayscale display is raised as well. Therefore, when a signal to perform a high grayscale display is inputted from the control circuit 102 to the power source 107, a signal to lower the grayscale of the gray display region is inputted from the controller 109 to the signal line driver circuit 103. In specific, a signal to control the angles of the liquid crystal molecules of the gray display region is inputted; therefore, a signal to control a voltage applied to a pixel electrode is inputted to the signal line driver circuit 103.

As a result, a high grayscale display in accordance with display contents can be performed in appropriate places of the pixel portion 105.

Figure 1B:
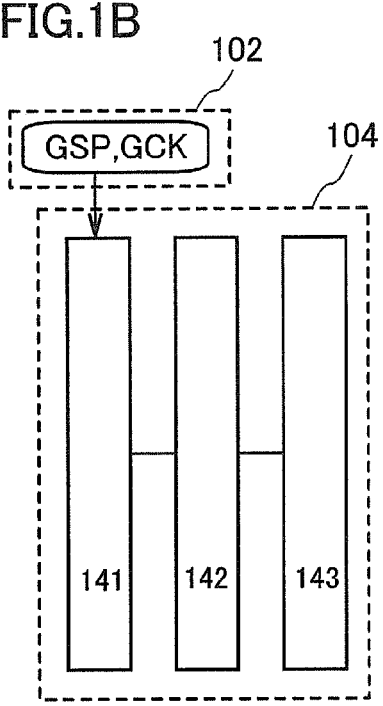
Figure 1C:
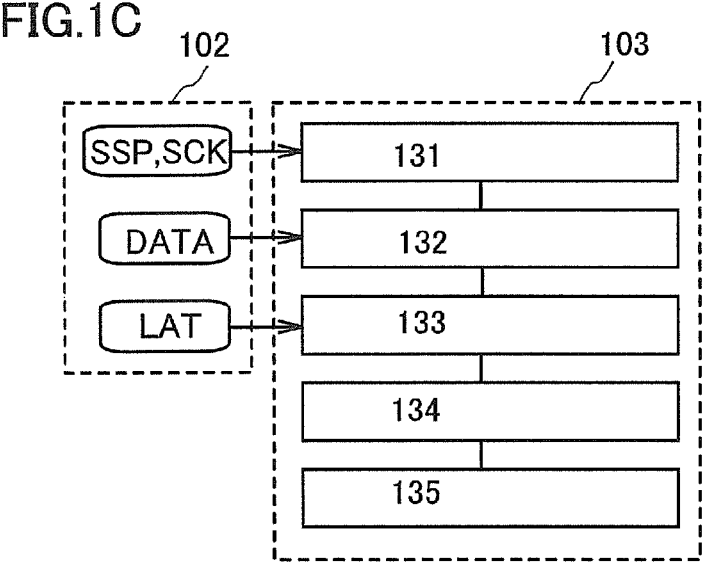

As shown in FIG. 1C, the signal line driver circuit 103 includes circuits each of which functions as a shift register 131, a first latch 132, a second latch 133, a level shifter 134, and a buffer 135. The shift register 131 is inputted with a signal such as a start pulse (SSP), the first latch 132 is inputted with data (DATA) such as a video signal, and the second latch 133 is inputted with a latch (LAT) signal and the like. It is to be noted that the signal line driver circuit of the invention is not limited to this.

Further, as shown in FIG. 1B, the scan line driver circuit 104 includes circuits each of which functions as a shift register 141, a level shifter 142, and a buffer 143. The shift register 141 is inputted with a signal such as a gate start pulse (GSP), a gate clock signal (GCK) and the like. It is to be noted that the scan line driver circuit of the invention is not limited to this.

The signal line driver circuit 103, the scan line driver circuit 104, and the pixel portion 105 as described above can be formed of semiconductor elements provided over the same substrate. For example, thin film transistors provided over a glass substrate can be used. Further, the signal line driver circuit 103 and the scan line driver circuit 104 may be mounted on a substrate by using an IC (Integrated Circuit) chip.

In this manner, the invention can provide a liquid crystal display device which can perform a high grayscale display in accordance with display contents by using the control circuit 102.

Embodiment Mode 2

Figure 2:
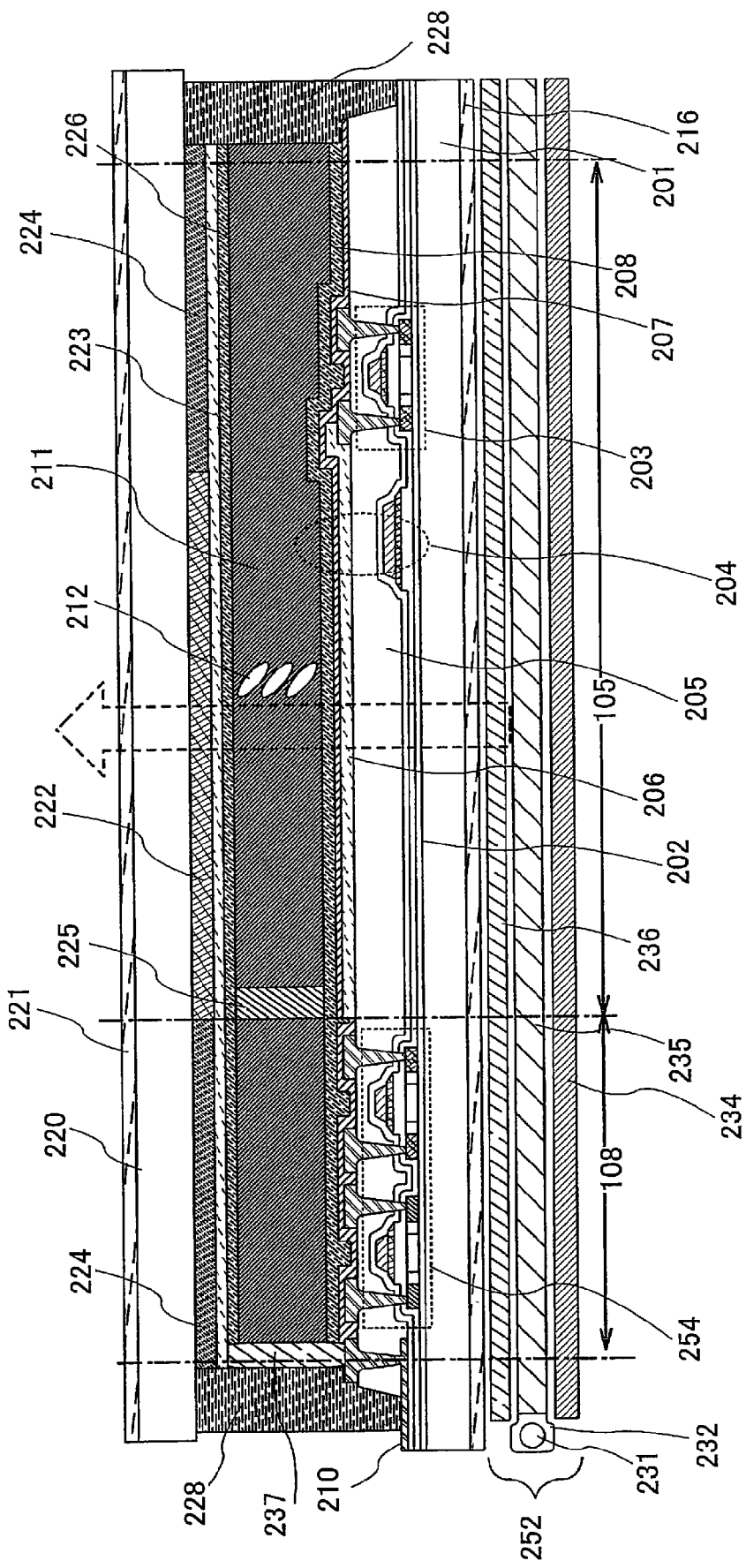
FIG. 2 is a cross sectional view of a liquid crystal display device of the invention.
Figure 3:
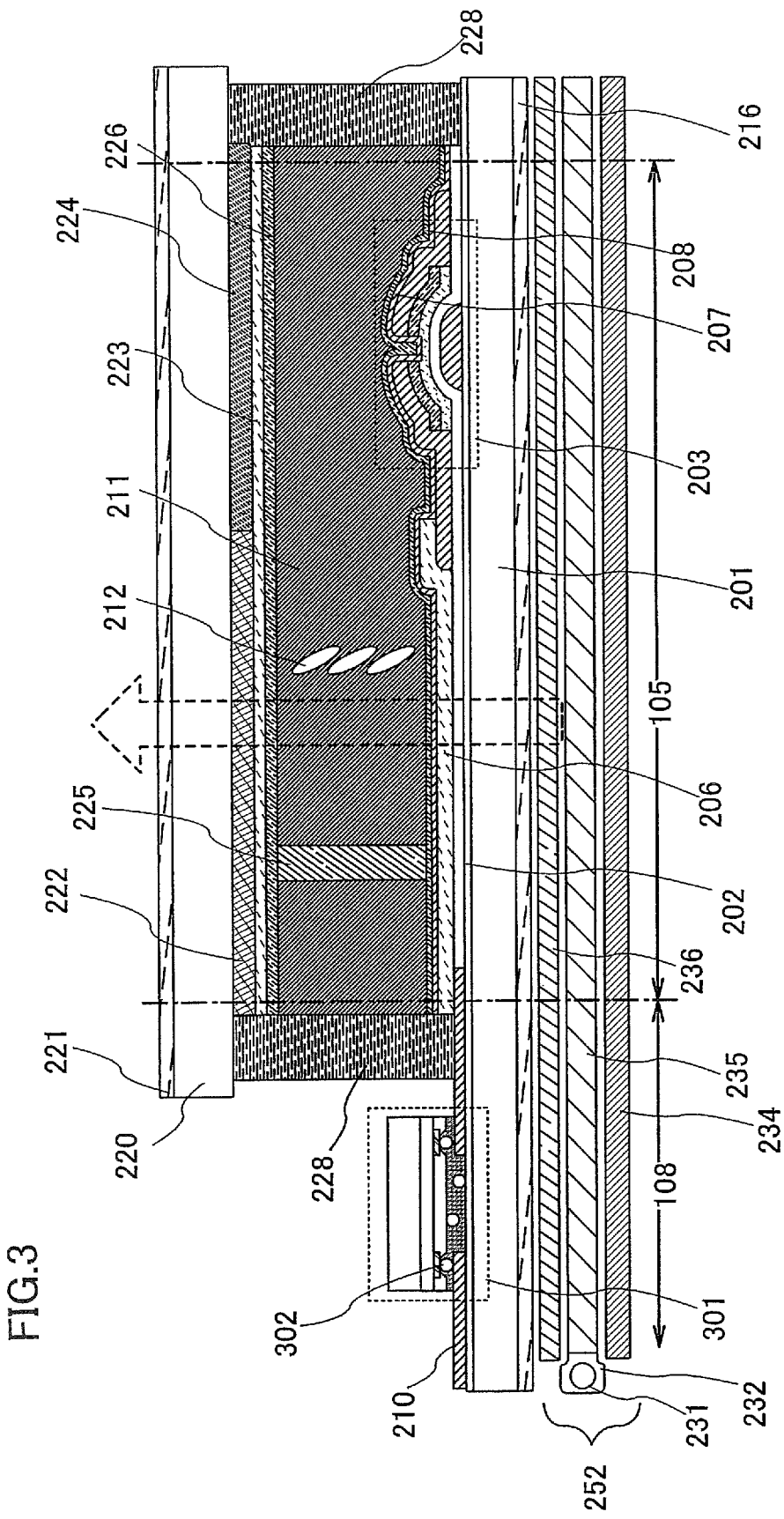
FIG. 3 is a cross sectional view of a liquid crystal display device of the invention.

In this embodiment mode, cross sectional views of a liquid crystal display device with the aforementioned system blocks are described as examples with reference to FIGS. 2 and 3.

In the pixel portion 105 and the driver circuit portion 108, a base film 202 is provided over a substrate 201. The substrate 201 can be formed of, for example, a glass substrate such as barium borosilicate glass and aluminoborosilicate glass, a quartz substrate, a stainless steel substrate, or the like. Further, a substrate formed of plastic represented by polyethylene terephthalate (PET), polyethylene naphthalate (PEN), and polyether sulfone (PES), or a synthetic resin having flexibility such as acrylic is likely to have low heat resistance as compared to other substrates in general; however, such a substrate can be used as long as it can resist a processing temperature of a manufacturing process.

The pixel portion 105 is provided with a transistor as a switching element through the base film 202. In this embodiment mode, a thin film transistor (TFT) is used as the transistor, which is referred to as a switching TFT 203. A TFT can be formed by many methods. For example, a crystalline semiconductor film is used as an active layer. A gate electrode is provided over the crystalline semiconductor film through a gate insulating film. An impurity element can be added to the active layer by using the gate electrode. In this manner, by adding an impurity element using the gate electrode, a mask for adding the impurity element is not required to be formed. The gate electrode may have a single layer structure or a stacked-layer structure. An impurity region can be formed as a high concentration impurity region and a low concentration impurity region by controlling the concentration thereof. Such a TFT having a low concentration impurity region is referred to as an LDD (Light doped drain) structure. The low concentration impurity region can be formed so as to overlap the gate electrode. Such a TFT is referred to as a GOLD (Gate Overlapped LDD) structure. In FIG. 2, the switching TFT 203 having a GOLD structure is shown. The polarity of the switching TFT 203 is an n-type as phosphorus (P) or the like is used for an impurity region thereof. In the case of forming a p-type TFT, boron (B) or the like may be added.

After that, a protective film to cover a gate electrode and the like is formed. A dangling bond in a crystalline semiconductor film can be terminated by hydrogen elements mixed in the protective film. In order to further enhance the flatness, an interlayer insulating film 205 may be formed. The interlayer insulating film 205 may be formed of an organic material, an inorganic material, or a stacked structure of these. Apertures are formed in the interlayer insulating film 205, the protective film, and the gate insulating film; thereby wires connected to the impurity region are formed. In this manner, the switching TFT 203 can be formed. It is to be noted that the invention is not limited to the structure of the switching TFT 203.

Then, a pixel electrode 206 connected to the wire is formed.

Further, a capacitor 204 is formed at the same time as the switching TFT 203. In this embodiment mode, the capacitor 204 can be formed of a stack of a conductive film formed at the same time as the gate electrode, the protective film, the interlayer insulating film 205, and the pixel electrode 206.

Further, transistors of the driver circuit portion 108 are formed at the same time. The transistors used for the driver circuit are formed into a CMOS circuit; therefore, they are referred to as a CMOS circuit 254. Each TFT which forms the CMOS circuit 254 may have a similar structure to the switching TFT 203. Further, the LDD structure can be used instead of the GOLD structure and a similar structure is not necessarily employed.

After that, a protective film 207 is formed to cover the wires of the switching TFT 203 and the wires of the pixel electrode 206 and the CMOS circuit 254. The protective film 207 can prevent an active layer, an interlayer insulating film 205, and the like from impurities and prevent the wire and the like from reacting with other materials.

An alignment film 208 is formed over the protective film 207. The alignment film 208 undergoes rubbing treatment.

Next, an opposite substrate 220 is provided. A color filter 222 and a black matrix (BM) 224 can be provided for the opposite substrate 220. These can be formed by known methods; however, a droplet discharging method (representatively an ink-jetting method) by which a predetermined material is dropped can eliminate the waste of the material. Further, the color filter 222 may have a structure where color conversion layers are stacked. The color filter and the like are provided in a region where the switching TFT 203 is not provided. It is to be noted that the color filter and the like may be formed of materials each of which exhibits red (R), green (G), or blue (B) in the case where a liquid crystal display device performs a full-color display, and a material which exhibits at least one color in the case of a mono-color display. The black matrix 224 is provided to reduce reflection of external light due to the wiring of the switching TFT 203 and the CMOS circuit 254. Therefore, the black matrix 224 is provided over the switching TFT 203 or the CMOS circuit 254.

Then, an opposite electrode 223 and an alignment film 226 are provided. The alignment film 226 undergoes rubbing treatment.

It is to be noted that the wire, the gate electrode, the pixel electrode 206, and the opposite electrode 223 included in the TFT can be selected from indium tin oxide (ITO), IZO (indium zinc oxide) in which zinc oxide (ZnO) is mixed in indium oxide by 2 to 20%, a conductive material in which silicon oxide ($SiO_2$) is mixed in indium oxide by 2 to 20%, a metal such as organic indium, organotin, tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), and the like, an alloy thereof, or metal nitride thereof.

Such an opposite substrate 220 is attached to the substrate 201 by using a sealing material 228. The sealing material 228 can be drawn over the substrate 201 by using a dispenser and the like. Further, a spacer 225 is provided for the pixel portion 105 and the driver circuit portion 108 in order to hold a space between the substrate 201 and the opposite substrate 220. The spacer 225 has a form such as a columnar form or a spherical form.

Liquid crystal 211 is injected between the substrate 201 and the opposite substrate 220 attached in this manner. It is preferable to inject the liquid crystal in vacuum. The liquid crystal 211 can be formed by a method other than the injecting method. For example, the liquid crystal 211 may be dropped and then the opposite substrate 220 may be attached thereto. Such a dropping method is preferably employed when using a large substrate.

The liquid crystal 211 includes a liquid molecule 212 of which angle is controlled by the pixel electrode 206 and the opposite electrode 223. Accordingly, transmission of light by a backlight unit 252 can be controlled; thereby a grayscale display can be performed.

In the invention, the liquid crystal molecule 212 is angled so as to be perpendicular to the substrate 201 in the case of a high grayscale display while it is angled so as to be in parallel to the substrate 201 in the case of a low grayscale display. Then, the angle of the liquid crystal molecule 212 is controlled so as to be more parallel to the substrate 201 when increasing the intensity of light from the backlight unit 252 in the case of the low grayscale region. Such control can be achieved by controlling a voltage value applied to the pixel electrode 206 and the opposite electrode 223 using a control circuit provided in the driver circuit portion 108. It is to be noted that the control circuit is not necessarily formed over the substrate 201 and a circuit connected through a connecting terminal 210 may be used as well. At this time, an anisotropic conductive film containing conductive particles can be used so as to be connected to the connecting terminal 210. Further, an opposite electrode 223 conducts with a portion of the connecting terminal 210, thereby a potential of the opposite electrode 223 can be common. For example, a bump 237 can be used for the conduction.

Next, description is made on a structure of the backlight unit 252. The backlight unit 252 is formed of a cold cathode tube as a light source 231 which emits fluorescence, a lamp reflector 232 to effectively lead fluorescence to a light-conductive plate 235, the light guide plate 235 by which light is totally reflected and led to the entire surface, a diffusing plate 236 for reducing variations in brightness, and a reflective plate 234 for reusing light leaked under the light-conductive plate 235.

The backlight unit 252 is connected to a control circuit for controlling the luminance of the light source 231. The luminance of the light source 231 can be raised by a signal supply from the control circuit. As a result, a high grayscale display with raised luminance can be performed in white display.

Further, a polarizer 216 is provided between the substrate 201 and the backlight unit 252 and a polarizer 221 is provided over the opposite substrate 220 as well. Each of the polarizers 216 and 221 includes a polarizing film and a phase contrast film and is adhered to the substrate 201 and the opposite substrate 220 respectively.

FIG. 3 shows a structure of a transistor (hereinafter referred to as an amorphous TFT) liquid crystal display device using an amorphous semiconductor film for a switching element. The pixel portion 105 is provided with the switching TFT 203 formed of an amorphous TFT. The amorphous TFT can be formed by a known method. For example, in the case of forming a channel-etch type, a gate electrode is formed over the base film 202, and then a gate insulating film, an n-type semiconductor film, an amorphous semiconductor film, a source electrode, and a drain electrode are formed so as to cover the gate electrode. An aperture is formed in the n-type semiconductor film by using the source electrode and the drain electrode. A portion of the amorphous semiconductor film is also removed at this time; therefore, this TFT is referred to as a channel-etch type. After that, a protective film is formed; thereby an amorphous TFT can be formed. Further, there is also a channel protective type amorphous TFT where a protective film is provided so that an amorphous semiconductor film is not removed when forming an aperture in the n-type semiconductor film by using the source electrode and the drain electrode. Other structures may be formed similarly to the channel etch type.

Subsequently, the alignment film 208 is formed similarly to FIG. 2, and then rubbing treatment is carried out.

Further, the opposite substrate 220 is provided similarly to FIG. 2 and attached by using the sealing material 228. By injecting the liquid crystal 211 between these, a liquid crystal display device can be formed.

In the case of forming a liquid crystal display device by using an amorphous TFT as the switching TFT 203, an IC circuit 301 formed of a silicon wafer can be mounted as a driver in the driver circuit portion 108 in consideration of an operating performance. For example, a signal to control the switching TFT 203 can be supplied by connecting a wire of an IC circuit 301 and a wire connected to the switching TFT 203 by using an anisotropic conductor containing a conductive particle 302. It is to be noted that a mounting method of the IC circuit is not limited to this and the IC circuit may be mounted by a wire bonding method.

Further, the IC circuit can be connected to the control circuit through the connecting terminal 210. At this time, an anisotropic conductive film containing the conductive particle 302 can be used to connect the IC circuit with the connecting terminal 210.

Other structures are similar to FIG. 2; therefore, description thereof is omitted here.

It is to be noted that the system blocks shown in FIGS. 1A to 1C can be similarly applied to a liquid crystal display device using an amorphous TFT.

In this manner, the invention is characterized by performing a high grayscale display of which luminance itself is enhanced by controlling a voltage supplied to the backlight unit 252. Further, the invention is characterized by controlling the angle of the liquid crystal molecule 212 and lowering a grayscale of the gray display. Therefore, the invention can be applied to a lot of liquid crystal display devices as shown in FIG. 2 or 3; thereby an effect to enhance a grayscale in accordance with display contents can be produced.

Embodiment Mode 3

In this embodiment mode, description is made on a structure of the backlight unit.

Figure 5A:
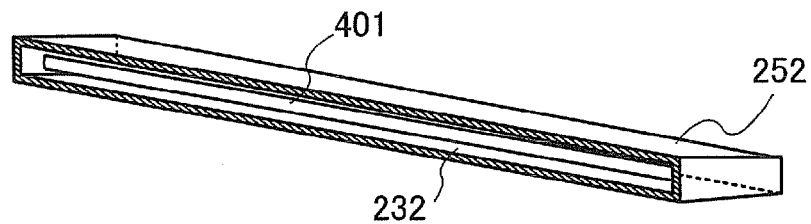
FIGS. 5A to 5D are views each showing a backlight unit used for a liquid crystal display device of the invention.

As shown in FIG. 5A, the backlight unit 252 can use a cold cathode tube 401 as a light source. Further, a lamp reflector 232 can be provided to effectively reflect light from the cold cathode tube 401. The cold cathode tube 401 is often used for a compact display device. For example, the cold cathode tube can be used for display of a personal computer.

Figure 5B:
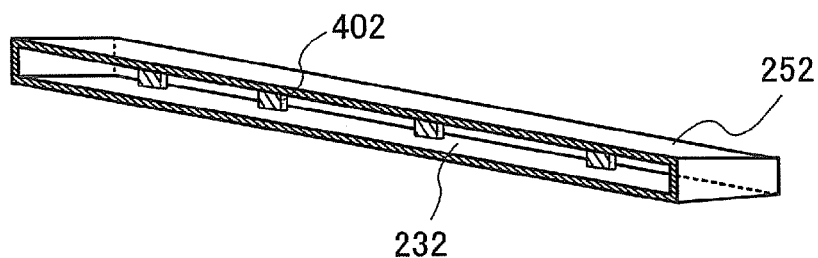

As shown in FIG. 5B, the backlight unit 252 can use a diode (LED) 402 as a light source. For example, a diode (W) 402 which emits white light is arranged at a predetermined interval. Further, the lamp reflector 232 can be provided so as to effectively reflect the light from the diode (W) 402.

Figure 5C:
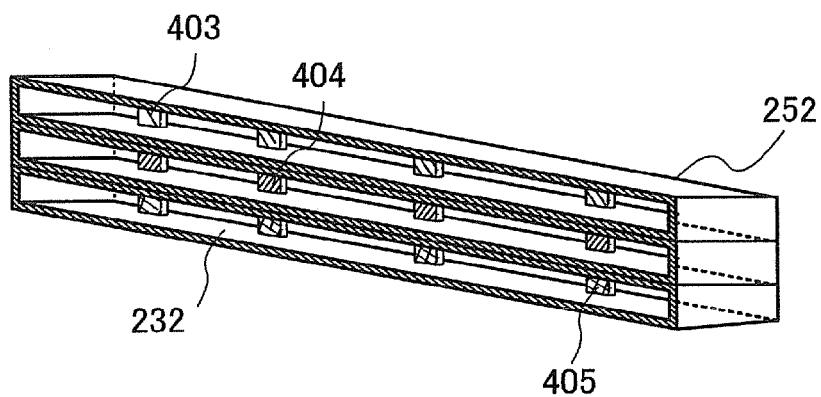

As shown in FIG. 5C, the backlight unit 252 can use diodes (LEDs) 403, 404, and 405 of each of RGB as light sources. By using the diodes (LEDs) 403, 404, and 405 of each of RGB, color reproducibility can be enhanced as compared to the case of using only the diode (W) 402 which emits white light. Further, the lamp reflector 232 can be provided so as to effectively reflect the light from the diode (W) 402.

Figure 5D:
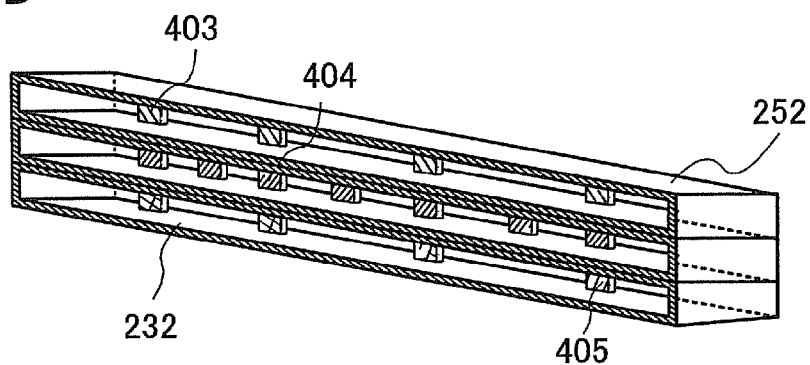

As shown in FIG. 5D, in the case where the diodes (LEDs) 403, 404, and 405 of each of RGB are used as light sources, the number and arrangement thereof are not required to be the same. For example, a color (for example, green) with low light emission intensity may be provided in a plurality of numbers.

Furthermore, the diode 402 which emits white light, the diodes (LEDs) 403, 404, and 405 of each of RGB may be used in combination.

Further, in the invention, a backlight unit is not necessarily provided as a light source. For example, in the case of forming the pixel portion 105 using a large substrate, a light source can be arranged on the back of the substrate. For example, diodes can be arranged at a predetermined interval. In this case also, the effect of the invention can be provided that the luminance of the light source can be raised in accordance with the display contents and that the grayscale can be enhanced.

Embodiment Mode 4

In this embodiment mode, description is made on a system and a structure to control the angle of the liquid crystal molecules in a gray display region.

Figure 11A:
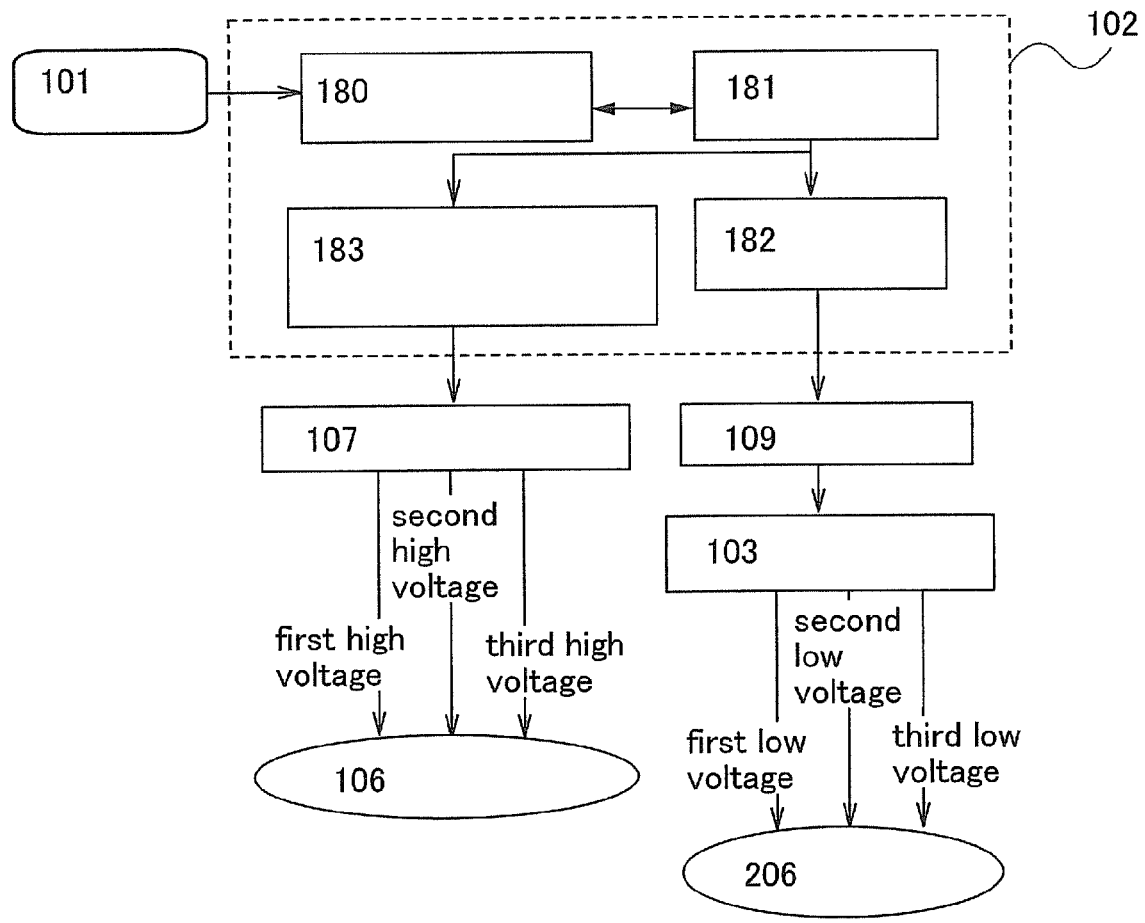
FIGS. 11A and 11B are system diagrams each showing a liquid crystal display device of the invention.

As shown in FIG. 11A, the control circuit 102 includes a frame memory 180 which stores the video signal 101. The frame memory 180 can store, for example, video signals for one frame. A determining circuit 181 determines whether to perform a high grayscale display or not by the stored video signals, namely the video information. At this time, in the case of performing a high grayscale display, the video signals 101 are not gently distributed in an intermediate grayscale region, but distributed separately into a high grayscale region and a low grayscale region. Therefore, whether to perform a high grayscale display or not can be determined depending on this distribution. In addition, whether to perform a high grayscale display or not can be determined depending on a difference between the number of grayscale levels of the high grayscale region and that of the low grayscale region. A standard of the luminance distribution to determine to perform the high grayscale display may be determined by a user or a designer.

When the determining circuit 181 determines to perform a high grayscale display, the number of grayscale levels is converted by a converter circuit 182 and inputted to the signal line driver circuit 103 through the controller 109. In a gray display region, the number of grayscale levels is converted to be small. That is, in the gray display region, a signal to lower the potential of the pixel electrode 206 is inputted to the pixel electrode 206 through the signal line 112. A level of the voltage may be set as a plurality of voltage levels such as first to third low voltages. It is needless to say that the voltage level may be a single voltage level. As a result, the angle of the liquid crystal molecule 212 of the gray display region can be controlled.

Figure 11B:
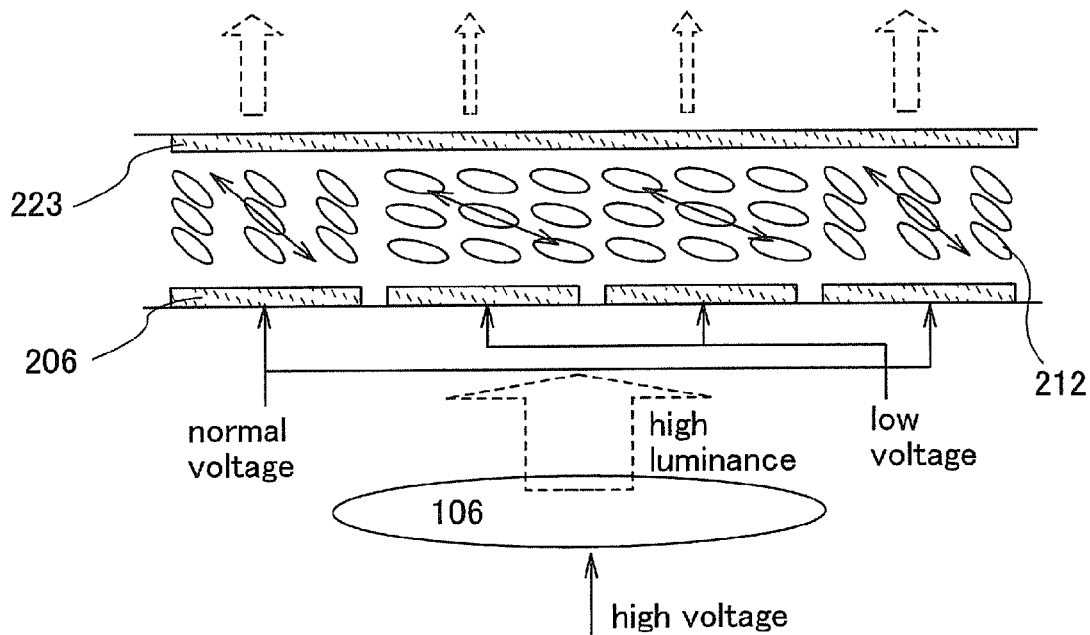

In specific, description is made with reference to a model diagram of the liquid crystal molecule 212 provided between the pixel electrode 206 and the opposite electrode 223 as shown in FIG. 11B. As described above, a high voltage is applied to the backlight 106 when performing a high grayscale display. Then, the backlight 106 emits light at higher luminance than normal. In the case where only a predetermined region (only regions at ends in FIG. 11B) performs a high grayscale display, luminance is too high for the other regions to perform a gray display. That is, a required gray display is not obtained but a display with raised luminance is performed. To prevent this, a low voltage is applied to the pixel electrode 206 in the other regions to control the angle of the liquid crystal molecule 212 (angles of arrows). It is to be noted that in the region to perform a high grayscale display, a normal voltage is applied to the pixel electrode 206. As a result, only the predetermined region can perform a high grayscale display and a display with reduced luminance rise can be performed in the other regions.

Further, when the determining circuit 181 determines to perform a high grayscale display, a signal to enhance the light emission of the backlight 106 is inputted to the power source 107 from the determining circuit 181 through an amplification signal generating circuit 183. At this time, a voltage level supplied to the backlight 106 may be set as a plurality of voltage levels such as the first to third high voltages. It is needless to say that the voltage level may be a single voltage level.

It is to be noted that in the case where the determining circuit 181 determines to perform a normal grayscale display without performing a high grayscale display, a normal voltage is applied to the backlight 106 from the power source 107. Further, a normal signal is inputted to the signal line driver circuit 103 through the controller 109 without being converted by the converter circuit 182.

Figure 12A:
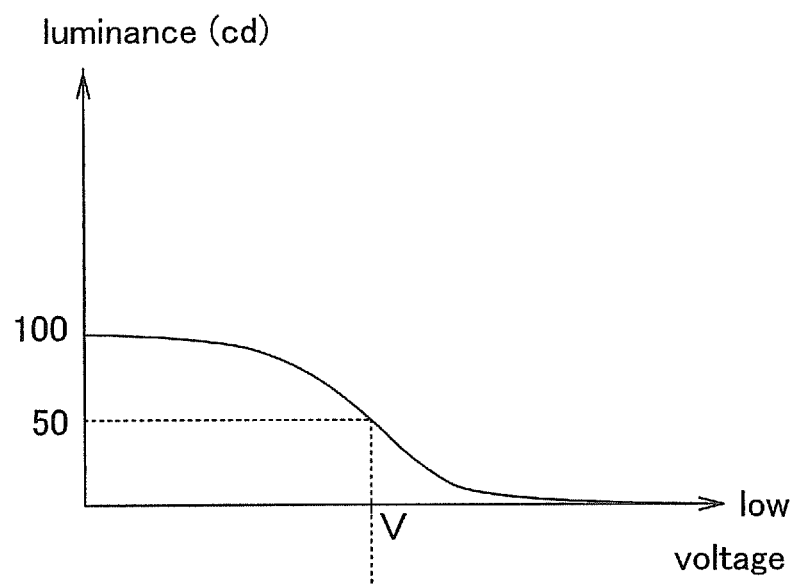
FIGS. 12A and 12B are graphs each showing a relation between luminance and voltage.
Figure 12B:
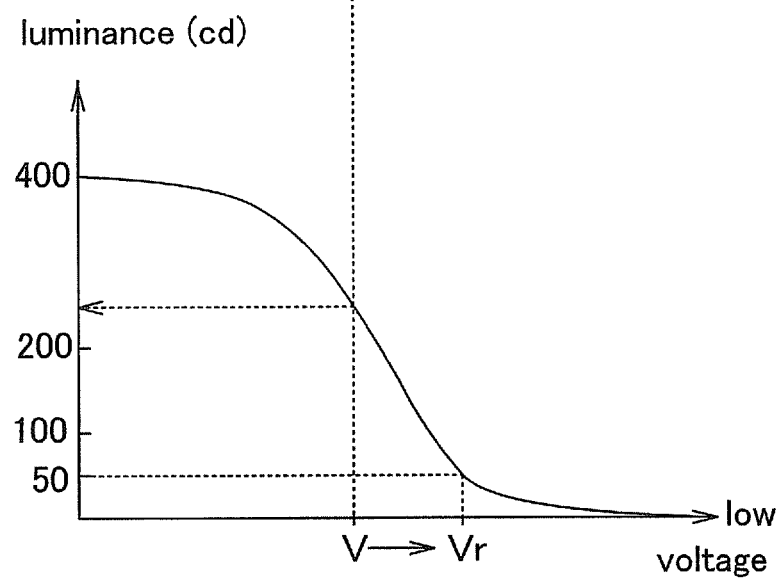

FIG. 12A shows a model graph of luminance characteristics relative to a voltage when a normal voltage is applied. FIG. 12B shows a model graph of luminance characteristics relative to a voltage when a high voltage is applied. In each graph, the voltage becomes lower to the right and the luminance becomes higher to the upper direction.

As shown in FIGS. 12A and 12B, it is assumed that the highest luminance reaches 100 cd when a normal voltage is applied and the highest luminance reaches 400 cd when a high voltage is applied. Then, a normal voltage which can display 50 cd as a gray display is set as a certain level (V). At the same level (V) of voltage in the graph for the high voltage, light is emitted at luminance of 200 cd or higher.

As a result, luminance of a gray display region which does not perform a high grayscale display is raised. In view of this, a voltage applied to the pixel electrode 206 is controlled as described above. For example, by decreasing the voltage from V to Vr as shown in FIG. 12B, the rise in luminance of a region which does not perform a high grayscale display can be reduced.

In this manner, a liquid crystal display device where only a predetermined region performs a high grayscale display in accordance with display contents can be provided.

Embodiment Mode 5

In this embodiment mode, description is made on the case where a grayscale is enhanced in accordance with display contents by using a light emitting device.

Figure 6A:
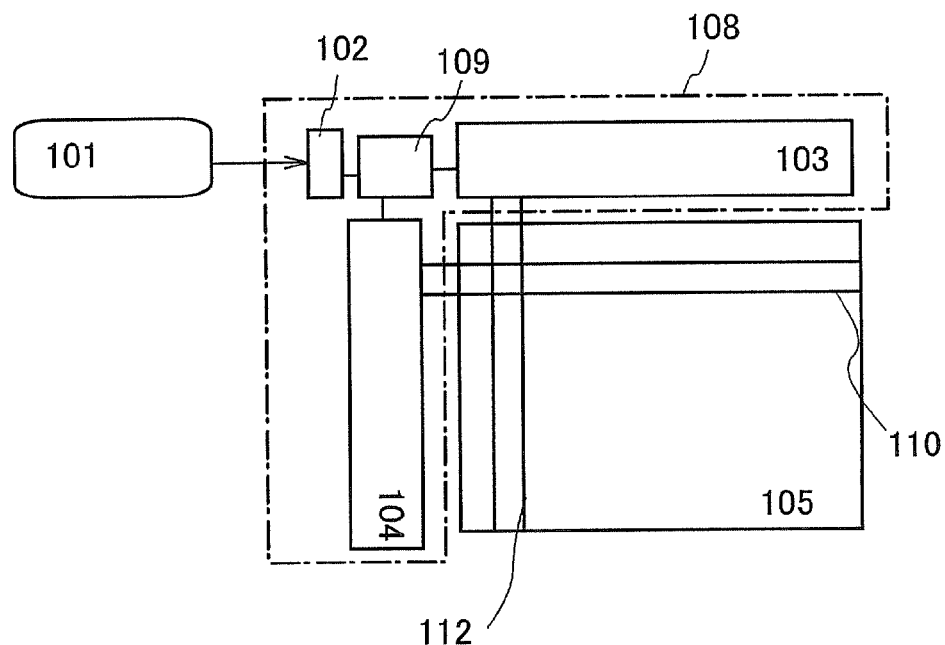
FIGS. 6A to 6C are system diagrams each showing a light emitting device of the invention.

FIG. 6A shows a system block diagram of the pixel portion 105 and the driver circuit portion 108 of a light emitting device. In the pixel portion 105, the signal line 112 and the scan line 110 cross each other. The pixel portion 105 includes a plurality of pixels and switching elements at intersections of the signal lines 112 and the scan lines 110 which form each pixel. By the switching elements, a potential of the light emitting element can be controlled. It is to be noted that the pixel portion of the invention is not limited to such an active type, but may have a passive type structure as well. The passive type can be formed by a simple process since each intersection does not have a switching element; thereby an aperture ratio can be increased.

The driver circuit portion 108 includes the control circuit 102, the signal line driver circuit 103, and the scan line driver circuit 104. The control circuit 102 has a function to control a grayscale in accordance with display contents of the pixel portion 105. For example, a grayscale of an appropriate place of the pixel portion 105 is enhanced in accordance with display contents of the pixel portion 105. In specific, the control circuit 102 inputted with the video signal 101 generates a signal to increase a potential supplied to the signal line 112 and the signal is inputted to the controller 109. As a result, the light emitting element provided at an intersection of the signal line 112 and the scan line 110 emits light at a higher luminance than normal; thereby a high grayscale display can be performed.

Further, the controller 109 has a function to input a signal from the control circuit 102 to the signal line driver circuit 103 and the scan line driver circuit 104. It is to be noted that in the case where the light emitting element emits light at a higher luminance than normal as described above, a grayscale of a gray display region which is a region other than a high grayscale display region can be lowered and a contrast can be increased. For example, a potential of a power source line connected to the light emitting element is increased in order to reduce the amount of current supplied to the light emitting element.

As a result, a high grayscale display in accordance with display contents can be performed at an appropriate place of the pixel portion 105.

Figure 6B:
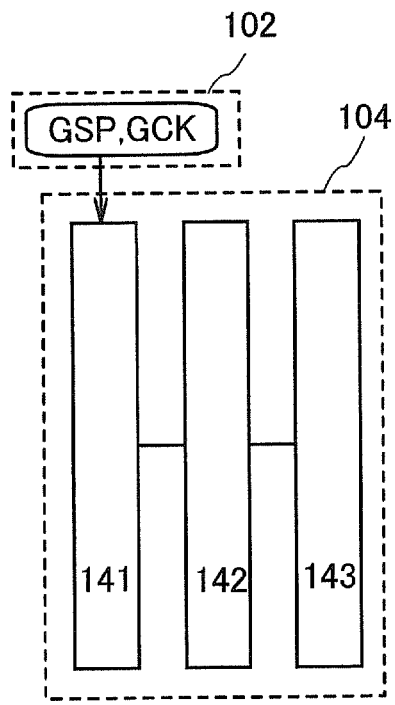
Figure 6C:
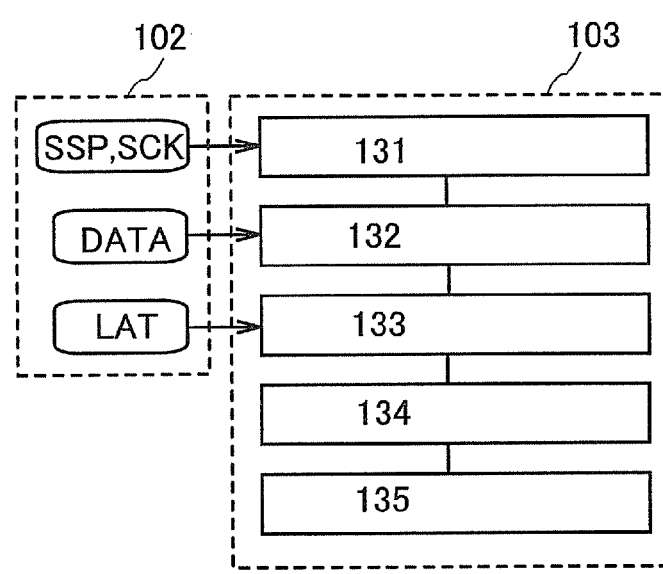

The signal line driver circuit 103 as shown in FIG. 6C includes circuits each of which functions as the shift register 131, the first latch 132, the second latch 133, the level shifter 134, and the buffer 135. The shift register 131 is inputted with a signal such as a start pulse (SSP), the first latch 132 is inputted with data (DATA) such as a video signal, and the second latch 133 is inputted with a latch (LAT) signal and the like. It is to be noted that the signal line driver circuit of the invention is not limited to this.

As shown in FIG. 6B, the scan line driver circuit 104 has circuits each of which functions as the shift register 141, the level shifter 142, and the buffer 143. The shift register 141 is inputted with a signal such as a gate start pulse (GSP) and a gate clock signal (GCK). It is to be noted that the scan line driver circuit of the invention is not limited to this.

The signal line driver circuit 103, the scan line driver circuit 104, and the pixel portion 105 as described above can be formed of semiconductor elements provided over the same substrate. For example, thin film transistors provided over a glass substrate can be used. Further, the signal line driver circuit 103 and the scan line driver circuit 104 may be mounted on a substrate by using an IC chip.

In this manner, the invention can provide a light emitting device which can perform a high grayscale display in accordance with display contents by using the control circuit 102.

Embodiment Mode 6

Figure 7:
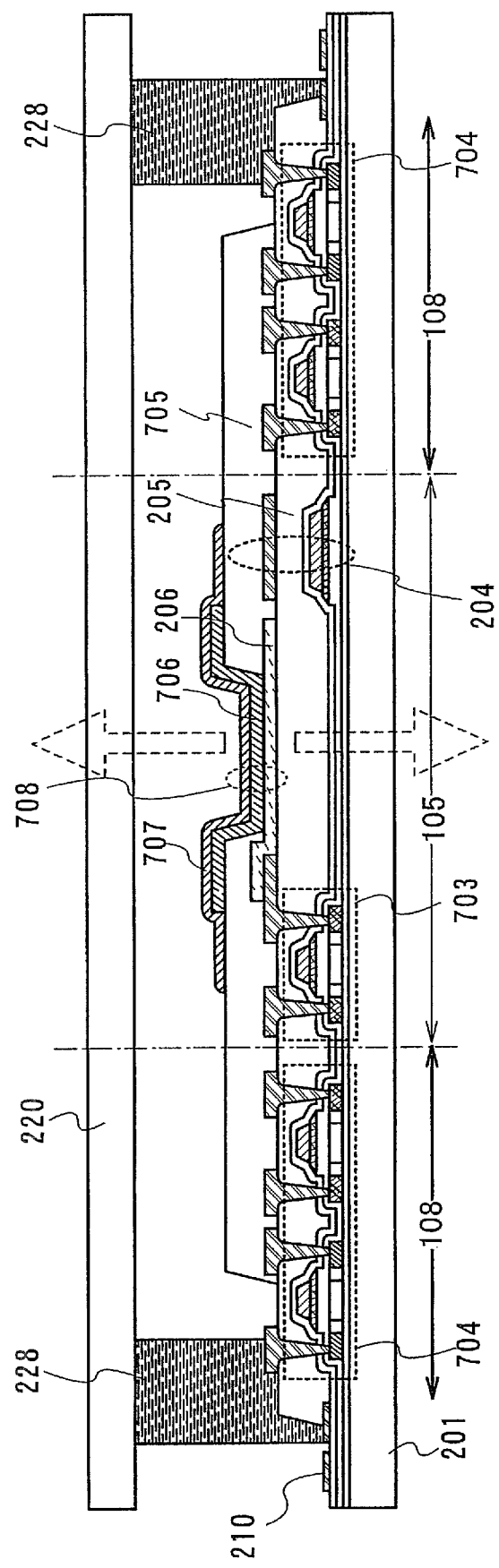
FIG. 7 is a cross sectional view of a light emitting device of the invention.

In this embodiment mode, a cross sectional view of a light emitting device having the aforementioned system block is described with reference to FIG. 7 as an example. Further, the same portions as those in the liquid crystal display device shown in FIG. 2 are denoted by the same reference numerals and description thereof is omitted.

The pixel portion 105 is provided with a switching TFT 703. A wire included in the switching TFT 703 is connected to the pixel electrode 206. In this embodiment mode, a pixel electrode is referred to as a first electrode 206 for convenience. An insulating film 705 is provided so as to cover end portions of the first electrode 206. The insulating film 705 can be formed of an organic material or an inorganic material. Then, an aperture is formed in the insulating film 705 above the first electrode 206. For example, in the case of using an organic material, a non-photosensitive resin or a photosensitive resin can be selected and the insulating film 705 having a taper on the side surface of the aperture can be formed depending on an exposure condition. By providing the taper, discontinuity of a film formed later can be prevented.

After that, an electroluminescent layer 706 is formed at the aperture of the insulating film 705. The electroluminescent layer includes layers each having a function, specifically a hole injecting layer, a hole transporting layer, a light emitting layer, an electron transporting layer, and an electron injecting layer. Further, a boundary between respective layers is not distinctive and a portion thereof is mixed in some cases.

Specific examples of the materials which form a light emitting layer are, when light emission of a red-based color is required, 4-dicyanomethylene-2-isopropyl-6-[2-(1,1,7,7-tetramethyljulolidine-9-yl)ethenyl]-4H-pyran (abbreviation: DCJTI); 4-dicyanomethylene-2-methyl-6-[2-(1,1,7,7-tetramethyljulolidine-9-yl)ethenyl]-4H-pyran (abbreviation: DCJT); 4-dicyanomethylene-2-tert-butyl-6-[2-(1,1,7,7-tetramethyljulolidine-9-yl)ethenyl]-4H-pyran (abbreviation: DCJTB); periflanthene; 2,5-dicyano-1,4-bis[2-(10-methoxy-1,1,7,7-tetramethyljulolidine-9-yl)ethenyl]benzene {2,3-bis(4-fluorophenyl) quinoxalinato} iridium (acetylacetonato) (abbreviation: Ir[Fdpq]2acac, and the like can be used. However, the material is not limited to these and a substance which exhibits light emission with a peak of an emission spectrum at 600 to 700 nm can be used.

When light emission of a green-based color is required, N,N'-dimethylquinacridon (abbreviation: DMQd), coumarin 6, coumarin 545T, tris(8-quinolinolato)aluminum (abbreviation: Alq3), or the like can be used. However, the material is not limited to these and a substance which exhibits light emission with a peak of an emission spectrum at 500 to 600 nm can be used.

When light emission of a blue-based color is required, 9,10-bis(2-naphthyl)-tert-butylanthracene (abbreviation: t-BuDNA), 9,9'-biantryl, 9,10-diphenylanthracene (abbreviation: DPA), 9,10-bis(2-naphthyl)anthracene (abbreviation: DNA), bis(2-methyl-8-quinolinolato)-4-phenylphenolato-gallium (abbreviation: BGaq), bis(2-methyl-8-quinolinolato)-4-phenylphenolato-aluminum (BAlq), or the like can be used. However, the material is not limited to these and a substance which exhibits light emission with a peak of an emission spectrum at 400 to 500 nm can be used.

When light emission of a white-based color is required, TPD (aromatic diamine), 3-(4-tert-butylphenyl)-4-phenyl-5-(4-biphenylyl)-1,2,4-triazole (abbreviation: TAZ), tris(8-quinolinolato) aluminum (abbreviation: Alq3), $Alq_3$ doped with Nile Red which is a red light emission pigment, and Alq3 may be stacked by a vapor deposition method or the like.

After that, a second electrode 707 is formed. The second electrode 707 can be formed of the aforementioned electrode material. At this time, the first electrode 206 or the second electrode 707 is formed to have a light transmitting property in accordance with a direction of light emission from the electroluminescent layer 706. For example, in the case where the first electrode 206 has a light transmitting property, a bottom emission type light emitting device is formed. In the case where the second electrode 707 has a light transmitting property, a top emission type light emitting device is formed. In the case where the first electrode 206 and the second electrode 707 have a light transmitting property, a dual-emission type light emitting device as shown in FIG. 7 is formed.

In this manner, a light emitting element 708 including the first electrode 206, the electroluminescent layer 706, and the second electrode 707 can be formed.

After that, the substrate 201 and the opposite substrate 220 are attached to each other by using the sealing material 228. In this embodiment mode, the sealing material 228 is provided over a portion of the driver circuit portion 108; therefore, a frame of a housing of a finished product may be narrow. It is needless to say that the arrangement of the sealing material 228 is not limited to this and the sealing material 228 may be provided outside the driver circuit portion 108.

A space formed by the attached substrates is injected with an inert gas such as nitrogen or filled with a resin material with a light transmitting property and a high moisture absorbing property. As a result, penetration of moisture and oxygen which can be a factor of deterioration of the light emitting element 708 can be prevented. Further, the spacer 225 may be provided to hold the space between the substrate 201 and the opposite substrate 220, and the spacer may have a moisture absorbing property.

The opposite substrate 220 can be provided with the color filter 222 and the black matrix 224. With the color filter, a full-color display is possible even in the case of using a mono-color light emitting layer. Further, even in the case of using a light emitting layer of each color, a wavelength of emitted light can be controlled; thereby a clear display can be provided. Further, the black matrix can reduce the reflection of external light due to a wire and the like.

A CMOS circuit 704 provided in the driver circuit portion 108 can control the switching TFT 703.

A control circuit can be integrated over the substrate 201 as well; however, an IC circuit formed of a silicon wafer may also be used. In that case, a video signal and the like from the IC circuit can be inputted to the CMOS circuit 704 through the connecting terminal 210. By the signal from a control signal, luminance of a light emitting element in a predetermined region can be raised in accordance with display contents.

Further, the polarizers 216 and 221 can be provided over the substrate 201 and the opposite substrate 220 respectively.

In this manner, the invention is characterized by performing a high grayscale display of which luminance is raised by controlling a voltage or a current supplied to the light emitting element 708. Further, in a gray display, a grayscale thereof is lowered. That is, the invention can be applied to the light emitting device shown as an example in FIG. 7; thereby an effect to enhance a grayscale in accordance with display contents can be provided.

It is to be noted in this embodiment mode that description is made using an active type light emitting device; however, luminance of a high grayscale region can be raised in accordance with display contents by using a passive type light emitting device as well.

Embodiment Mode 7

In this embodiment mode, a cross sectional view of a light emitting device which is different from the aforementioned embodiment modes is shown as an example. Further, the same portions as those in the light emitting device shown in FIG. 7 are denoted by the same reference numerals and description thereof is omitted. Further, in this embodiment mode, the pixel portion 105 and the sealing material 228 are illustrated for description.

Figure 14A:
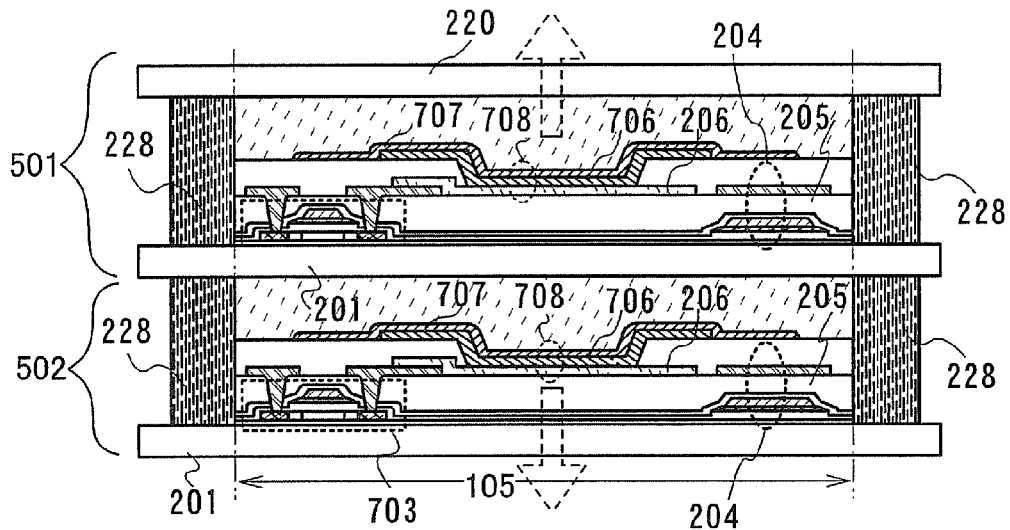
FIGS. 14A to 14C are cross sectional views each showing a light emitting device of a light emitting device of the invention.

As shown in FIG. 14A, a top emission type light emitting device 501 and a bottom emission type light emitting device 502 can be attached to form one light emitting device. In this case, the substrate 201 of the top emission type light emitting device can be used as an opposite substrate of the bottom emission type light emitting device 502.

For example, in the top emission type light emitting device 501, up to the light emitting element 708 is formed. Then, the sealing material 228 is provided and sealed using the bottom emission type light emitting device 502. At this time, the bottom emission type light emitting device 502 is preferably completed. That is, the bottom emission type light emitting device 502 is in a state that up to the opposite substrate 220 is attached by the sealing material 228.

Further, when attaching the top emission type light emitting device 501 and the bottom emission type light emitting device 502 in this manner, it is preferable to provide the formed space with a resin material having a high moisture absorbing property. For example, an epoxy resin can be used as the resin material having a high moisture absorbing property. As a result, the adhesion can be enhanced.

Figure 14B:
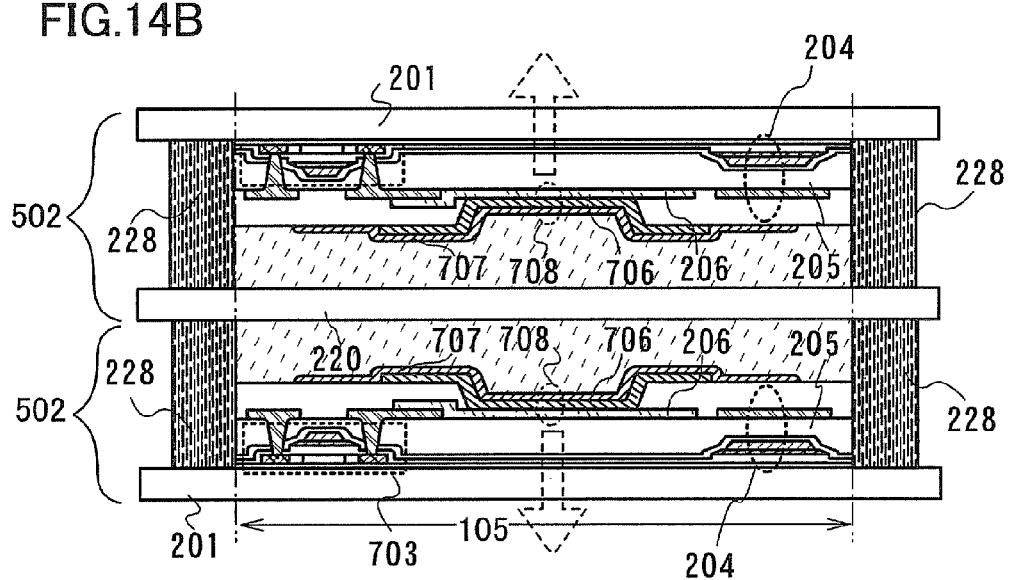

A light emitting device to which the invention can be applied is not limited to a light emitting devices which emit light in different directions, such as a top emission type light emitting device and a bottom emission type light emitting device. Light emitting devices which emit light in the same direction may be attached to each other. For example, as shown in FIG. 14B, the bottom emission type light emitting devices 502 may be attached to form one light emitting device. In this case, as the directions of light emission are the same, the bottom emission type light emitting devices 502 are provided so as to face each other and attached by the sealing materials 228. At this time, the opposite substrate 220 can be used commonly for the bottom emission type light emitting devices 502.

For example, in one of the bottom emission type light emitting devices 502, up to the light emitting element 708 is formed. Then, the sealing material 228 is formed to attach the other bottom emission type light emitting device provided with the opposite substrate 220. At this time, the other bottom emission type light emitting device 502 is preferably completed. That is, the bottom emission type light emitting device 502 is in a state that up to the opposite substrate 220 is attached by the sealing material 228.

Further, when attaching the bottom emission type light emitting devices 502 to each other in this manner, it is preferable to provide the formed space with a resin material having a high moisture absorbing property. For example, an epoxy resin can be used as the resin material having a high moisture absorbing property. As a result, the adhesion can be enhanced.

In the case where the top emission type light emitting devices are attached to each other, the substrate 201 is provided therebetween. For example, the top emission type light emitting devices each of which has up to the opposite substrate 220 attached by the sealing material 228 can be attached to each other by providing an adhesive on the back of the substrate 201.

Figure 14C:
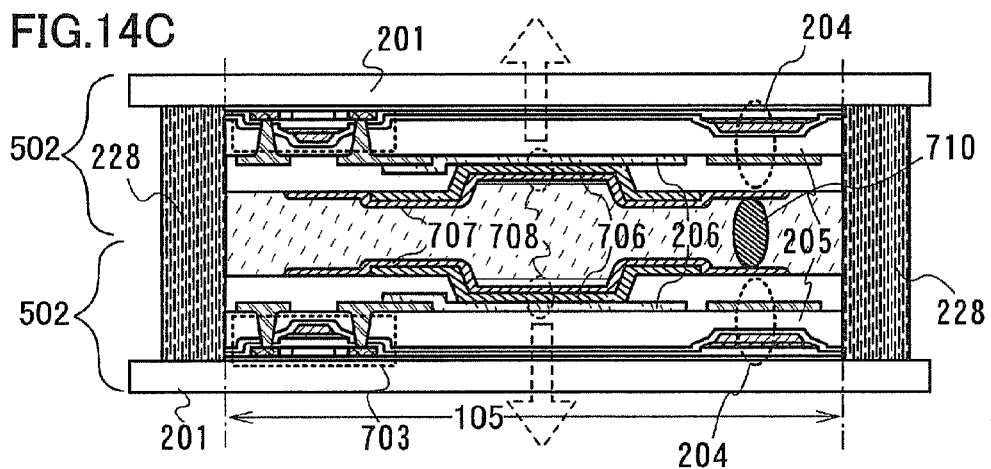

Further, in the case of attaching light emitting devices, they may be directly attached without providing the opposite substrate 220 therebetween. For example, in the case of attaching the bottom emission type light emitting devices 502 to each other, they can be formed into one light emitting device without providing an opposite substrate therebetween as shown in FIG. 14C. In this case, thickness corresponding to the opposite substrate can be reduced. A space formed by the attached light-emitting devices in this manner is injected with an inert gas such as nitrogen or filled with a resin material having a light transmitting property and a high moisture absorbing property.

Further, a spacer can be provided between the substrates to hold a distance between the substrates in FIGS. 14A to 14C. For example, as shown in FIG. 14C, a spacer 710 is provided between the capacitors 204. As a result, the distance between the substrates 201 can be held.

In a light emitting device with the aforementioned structure, luminance of a high grayscale region can be raised in accordance with display contents as well.

It is to be noted in this embodiment mode that description is made using an active type light emitting device; however, luminance of a high grayscale region can be raised in accordance with display contents by using a passive type light emitting device as well.

Embodiment Mode 8

In this embodiment mode, description is made with reference to FIGS. 8A to 8D on an equivalent circuit of a pixel included in a light emitting device.

Figure 8A:
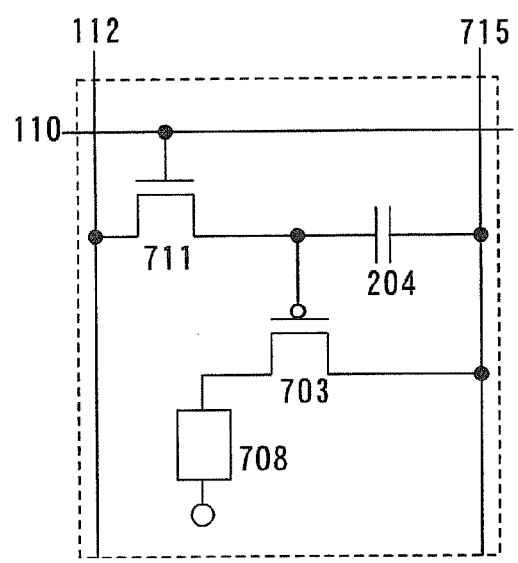
FIGS. 8A to 8D are pixel circuits which can be used for a light emitting device of the invention.

FIG. 8A shows an example of an equivalent circuit of a pixel, which includes the signal line 112, a power source line 715, the scan line 110, of which intersection has a light emitting element 708, the transistors 703 and 711, and the capacitor 204.

In such an equivalent circuit, a video signal is inputted from a signal line driver circuit to the signal line 112. The transistor 711 is called a switching transistor and can control a potential supply of the video signal to a gate of the transistor 703 in accordance with selecting signals inputted to the scan line 110. The transistor 703 is called a driving transistor and can control a current supply to the light emitting element 708 in accordance with a potential of the video signal. Display can be performed depending on a light emission state of a light emitting element which is dependent on the supplied current. The capacitor 204 can hold a gate-source voltage of the transistor 703. It is to be noted that the capacitor 204 is shown in FIG. 8A; however, it is not required to be provided when gate capacitance of the transistor 703 or other parasitic capacitance is large enough.

Figure 8B:
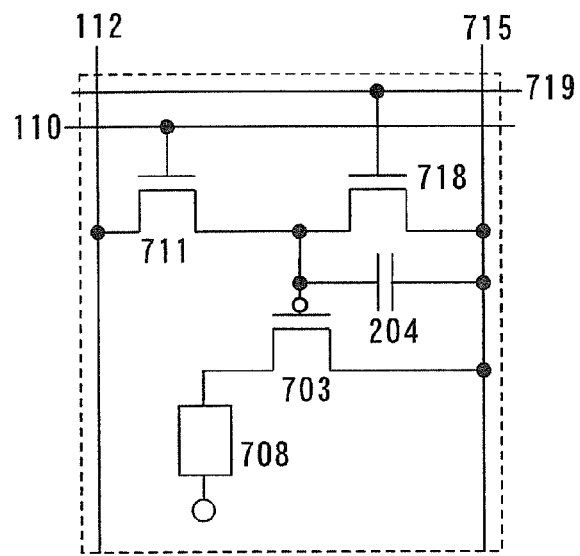

FIG. 8B shows an equivalent circuit of a pixel which corresponds to the equivalent circuit of the pixel shown in FIG. 8A which is additionally provided with a scan line 719 and a transistor 718.

The transistor 718 is called an erasing transistor and can make the gate and source of the transistor 703 to have the same potentials, thereby forcibly shutting a current supply to the light emitting element 708. Therefore, in a time grayscale display, a video signal can be inputted before video signals are inputted to all pixels, which leads to improve a duty ratio.

Figure 8C:
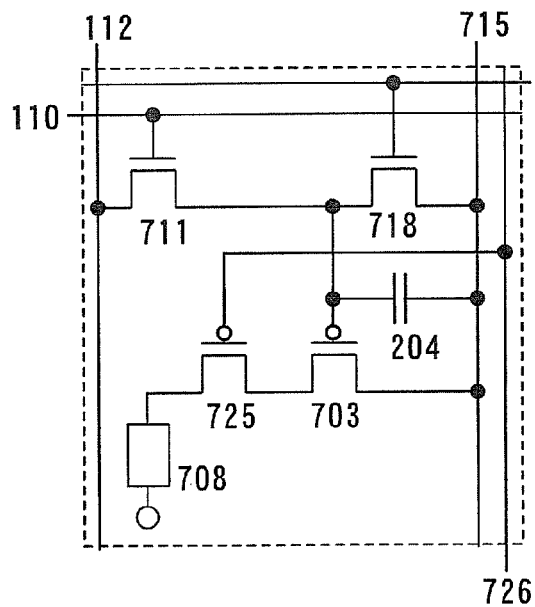

FIG. 8C shows the equivalent circuit of the pixel shown in FIG. 8B which is additionally provided with a transistor 725 and a wire 726. A gate potential of the transistor 725 is fixed by the wire 726. The transistor 703 and the transistor 725 are connected in series between a power source line 715 and the light emitting element 708. Therefore, in FIG. 8C, the transistor 725 controls a current value supplied to the light emitting element 708 and the transistor 703 can control whether to supply the current or not to the light emitting element 708.

The equivalent circuits of the pixels shown in FIGS. 8A to 8C as described above can be driven by a digital method. In the case of driving by the digital method, some variations in electrical characteristics of each driving transistor are not a problem since they are used as switching elements.

Figure 8D:
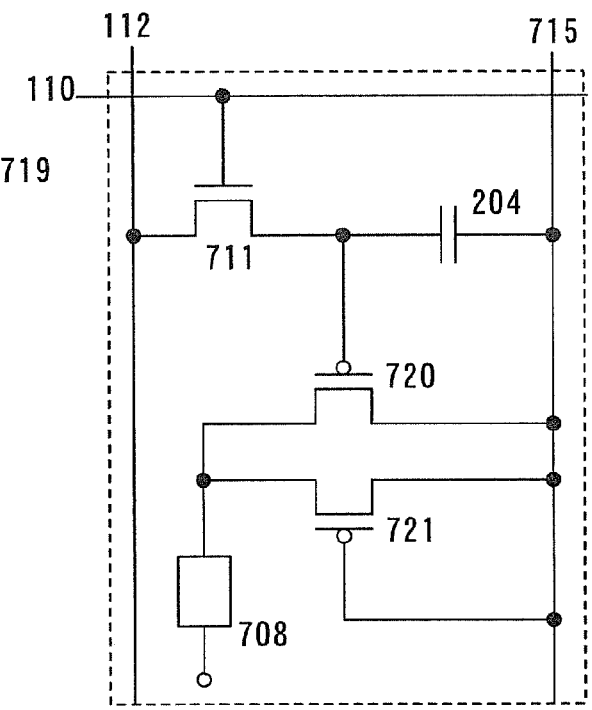

An equivalent circuit of a pixel included in the light emitting device of the invention can be driven by a digital method or an analog method. For example, an equivalent circuit of a pixel shown in FIG. 8D includes the signal line 112, the power source line 715, the scan line 110, of which intersection has the light emitting element 708, the transistors 711, 720, and 721, and the capacitor 204. In FIG. 8D, the transistors 720 and 721 which are p-channel transistors form a current mirror circuit. In such an equivalent circuit of a pixel, a digital video signal is inputted from the signal line 112 in the digital method, thereby a current value supplied to the light emitting element 708 is controlled in accordance with a time grayscale method. In the analog method, analog video signals are inputted from the signal line 112, in accordance with which a current value supplied to the light emitting element 708 is controlled. In the case of driving by the analog method, low power consumption can be expected.

In the aforementioned pixel, signals are inputted from the signal line driver circuit to the signal line 112, the power source lines 715, and 726. Further, the scan lines 110 and 719 are inputted with signals from the scan line driver circuit. The signal line driver circuit and the scan line driver circuit may be provided in a single number or a plurality of numbers. For example, a first scan line driver circuit and a second scan line driver circuit can be provided through the pixel portion 105.

Further, in the pixel shown in FIG. 8A, a current supply to the light emitting element 708 can be forcibly shut as described with reference to FIG. 8B. For example, the transistor 711 is selected by the first scan line driver circuit at timing that the light emitting element 708 emits light and a signal which forcibly shuts a current supply to the light emitting element 708 is supplied from the second scan line driver circuit to the scan line 110. The signal which forcibly shuts a current supply (Write Erase Signal) is a signal which provides a potential so that the first electrode 206 and the second electrode 707 of the light emitting element 708 have the same potentials. In this manner, a current supply to the light emitting element 708 can be forcibly shut by the driving method as well, which leads to improve a duty ratio.

In this manner, an equivalent circuit of a pixel included in the light emitting element of the invention can have various modes.

Embodiment Mode 9

In this embodiment mode, description is made on a system and a structure for controlling a voltage or a current value supplied to a light emitting element in a gray display region. It is to be noted that a voltage or a current supplied to the light emitting element 708 can be determined by a potential difference between the first electrode 206 and the second electrode 223. In this embodiment mode, the second electrode 223 is shared by each light emitting element; therefore, a potential of the first electrode 206 is controlled. However, the invention is not limited to this and a potential of the second electrode 223 may be controlled as well.

Figure 13A:
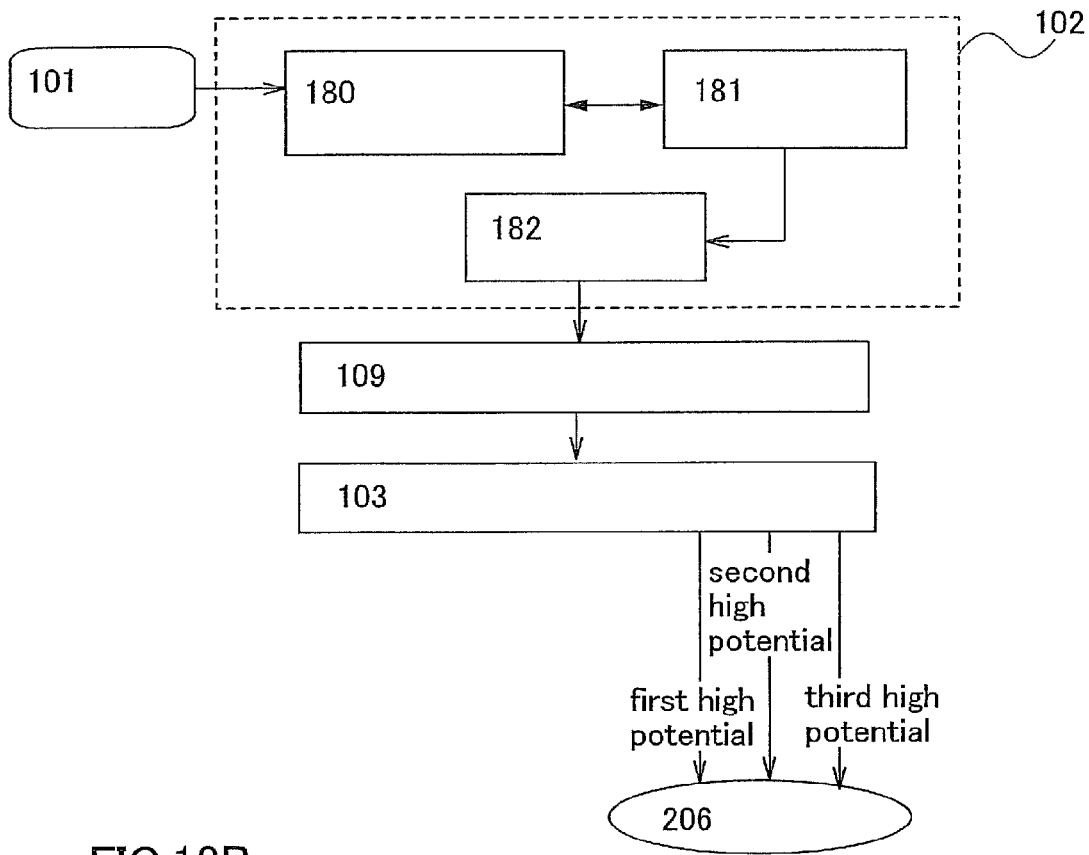
FIGS. 13A to 13C are system diagrams each showing a light emitting device of the invention.

As shown in FIG. 13A, the control circuit 102 includes the frame memory 180 and the video signal 101 is stored in the frame memory 180. The frame memory 180 can store, for example, video signals for one frame. The determining circuit 181 determines whether to perform a high grayscale display or not by the stored video signals, namely the video signals. At this time, in the case of performing a high grayscale display, the video signals 101 are not gently distributed in an intermediate grayscale region, but distributed separately into a high grayscale region and a low grayscale region. Therefore, whether to perform the high grayscale display or not can be determined depending on this distribution. In addition, whether to perform the high grayscale display or not can be determined depending on a difference between the number of grayscale levels of the high grayscale region and that of the low grayscale region. A standard of the luminance distribution to determine to perform the high grayscale display may be determined by a user or a designer.

When the determining circuit 181 determines to perform a high grayscale display, the number of grayscale levels is converted by the converter circuit 182 and inputted to the signal line driver circuit 103 through the controller 109. Differently from a liquid crystal display device, a light emitting device can perform a high grayscale display in an appropriate place of the pixel portion 105 by controlling an amount of current supplied to each light emitting element 708. Therefore, the number of grayscale levels is converted so that the number of grayscale levels in a region for performing a high grayscale display is increased while the number of grayscale levels in a region for performing a gray display is decreased. A signal in accordance with the raised grayscale level is to be inputted from the signal line driver circuit 103 to the signal line 112 so as to control the potential of the first electrode 206 of the light emitting element to be high. A potential to be raised may be set as a plurality of potentials such as first to third potentials. It is needless to say that the potential may be a single potential. When a signal in accordance with the lowered grayscale level is inputted from the signal line driver circuit 103 to the signal line 112, the potential of the first electrode 206 of the light emitting element is controlled to be low. As a result, luminance of the light emitting element 708 included in a predetermined pixel can be raised in accordance with display contents.

As another mode, in the case where a potential of the second electrode 223 is controlled, the second electrode 223 is shared by the light emitting elements 708; therefore, potentials of the second electrodes 223 in all light emitting elements are similarly controlled. In specific, the potentials of the second electrodes 223 are controlled to be low in order to perform a high gray scale display. Therefore, in a gray display region other than a high grayscale display, the potential of a second electrode 206 of a light emitting element is selectively controlled to be low. As a result, it can be prevented that the luminance of the gray display region which does not perform a high grayscale display rises.

It is needless to say that the potential of the signal line 112 is not required to be controlled if the potential of the second electrode 223 is controlled by patterning without sharing the second electrode 223 by the light emitting elements 708.

Figure 13B:
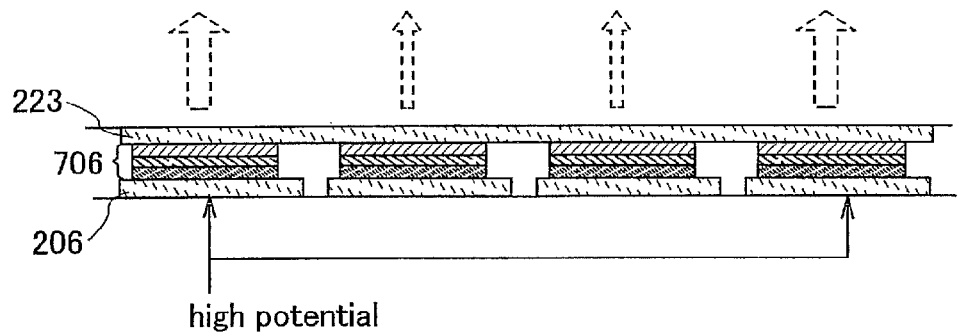

In specific, description is made with reference to a model diagram of the electroluminescent layer 706 provided between the first electrode 206 and the second electrode 223 as shown in FIG. 13B. In the case where only a predetermined region (only regions at ends in FIG. 13B) performs a high grayscale display when performing the high grayscale display as described above, the potential of the first electrode 206 is controlled by a signal from the signal line 112 so that the electroluminescent layer 706 provided in the region for the high grayscale display has a high potential.

Figure 13C:
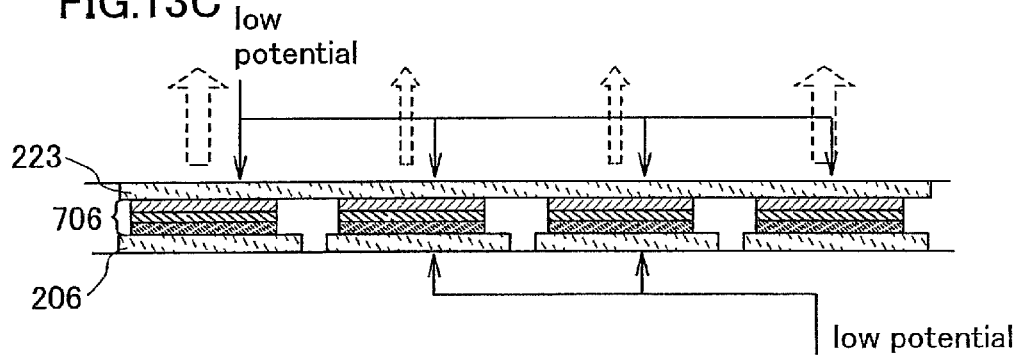

As another mode, in the case where a high grayscale display is performed by controlling the potential of the shared second electrode 223 as shown in FIG. 13C, the potential of the first electrode 206 is selectively set low in order to keep luminance of the other regions so that the potentials of all the second electrodes 223 of all light emitting elements become low.

As a result, only a predetermined region can perform a high grayscale display and the other regions can perform display where the rise in luminance is prevented.

Such a control method can be applied to the case of the analog method. It is to be noted in the case of the digital method that light emission time may be controlled to be short in the aforementioned region which performs a gray display. For example, an erasing transistor is used to forcibly turn off the light emitting element 708.

Embodiment Mode 10

Electronic devices provided with the light emitting device of the invention include a television device (also simply referred to as a television or a television receiver), a digital camera, a digital video camera, a portable phone device (also simply referred to as a portable phone or a mobile phone), a portable information terminal such as a PDA, a portable game machine, a monitor for a computer, a computer, an audio reproducing device such as a car audio set, an image reproducing device provided with a recording medium, such as a home game machine, and the like. Specific examples of these are described with reference to FIGS. 9A, 9B, and 10A to 10C.

Figure 9A:
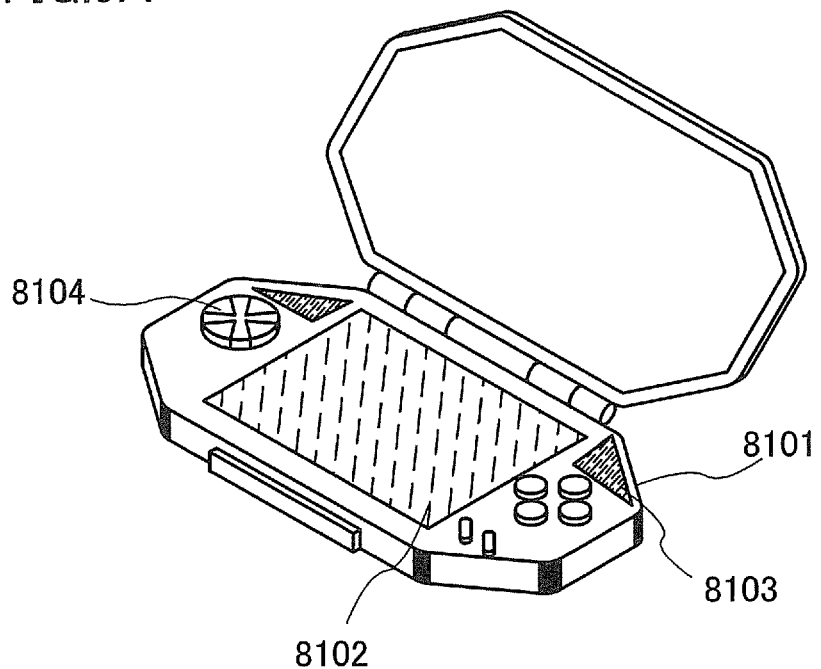
FIGS. 9A and 9B are views each showing a game machine using the invention.
Figure 9B:
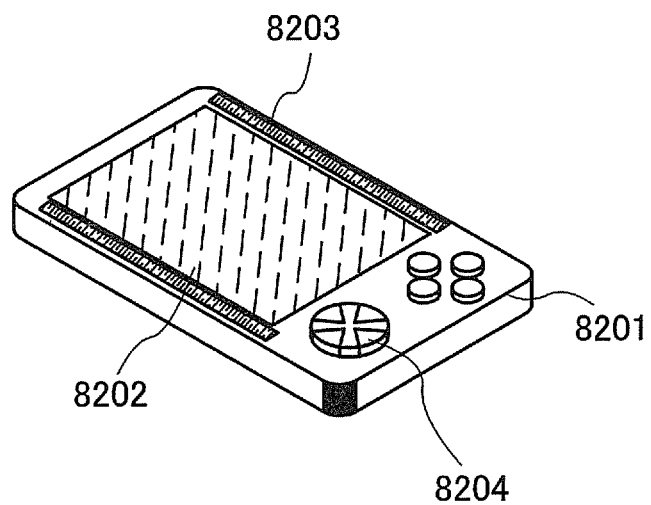

First, description is made with reference to FIGS. 9A and 9B on a portable game machine.

FIG. 9A shows a portable game machine including a main body 8101, a display portion 8102, a speaker 8103, a control button 8104, and the like. The game machine of this embodiment mode has a fixed game program.

The display device of the invention can be applied to the display portion 8102 of such a portable game machine and a grayscale of display can be effectively enhanced in accordance with game contents. As a result, a game machine which provides an improved realistic sensation can be provided.

FIG. 9B shows a portable game machine including a main body 8201, a display portion 8202, a speaker 8203, a control button 8204, and the like. The game machine of this embodiment mode can be used by changing a game program; therefore, it may be provided with a socket for inserting game software.

The display device of the invention can be applied to the display portion 8202 of such a portable game machine and a grayscale of display can be effectively enhanced in accordance with game contents. As a result, a game machine which provides an improved realistic sensation can be provided and a high added value of the game machine can be increased.

Figure 10A:
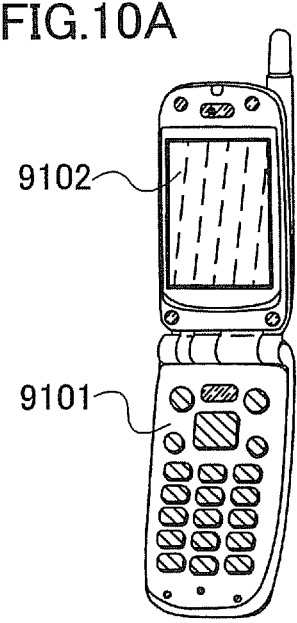
FIGS. 10A to 10C are views each showing an electronic device using the invention.

A portable phone shown in FIG. 10A includes a main body 9101, a display portion 9102, and the like. The display device of the invention can be applied to the display portion 9102 and a grayscale of display can be effectively enhanced in accordance with display contents. As a result, a high added value of the portable phone can be increased.

Figure 10B:
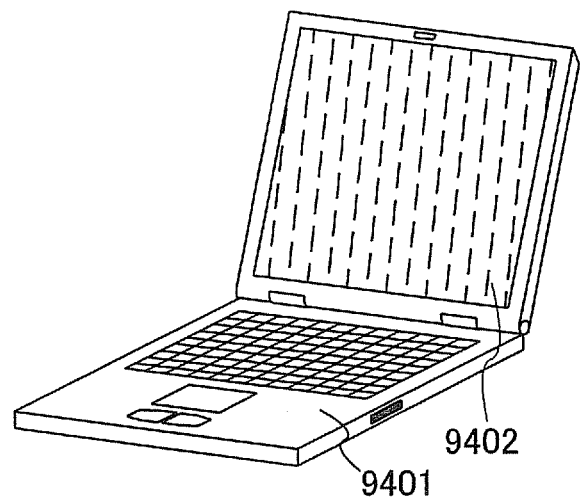

A portable computer shown in FIG. 10B includes a main body 9401, a display portion 9402, and the like. The display device of the invention can be applied to the display portion 9402 and a grayscale of display can be effectively enhanced in accordance with display contents. As a result, a high added value of the portable computer can be increased.

Figure 10C:
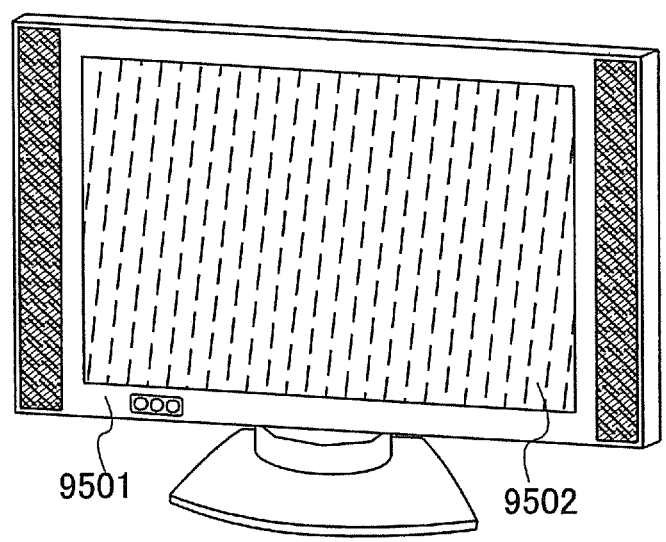

A television device shown in FIG. 10C includes a main body 9501, a display portion 9502, and the like. The display device of the invention can be applied to the display portion 9502 and a grayscale of display can be effectively enhanced in accordance with display contents. As a result, a high added value of the television device can be increased.

In this manner, according to the invention, electronic devices which can effectively enhance a grayscale of display and has a high added value can be provided.

Embodiment Mode 11

In this embodiment mode, description is made on an operating method of the display device. In specific, a preferable example to select a high grayscale display or a low grayscale display, a procedure of a grayscale control, and the like are described.

In the invention, in the case of displaying an image with high contrast, a focus is made on a method to set a high luminance region at higher luminance and a low luminance region in the periphery at normal luminance or lower luminance to enhance an image contrast. However, display quality as a whole can be enhanced by optimizing display luminance of an image by a similar technological idea.

As described in Embodiment Mode 9, the example that the video signals are not gently distributed in the intermediate grayscale region but distributed separately into the high grayscale region and the low grayscale region is described as a condition of an image when performing a high grayscale display. In the case of displaying an image such as a night scene and a firework in the night sky, it is preferable to display a high grayscale region at higher luminance since an image is more clearly shown. On the other hand, the case where a black object appears in a background which is totally bright also corresponds to the aforementioned condition. In the case of such an image, when rising luminance of a high luminance region as the background, a whole image is whitened and display quality may be further decreased. On the contrary, such an image is preferably provided with treatment to decrease the luminance of the whole screen so that a calmer image with high display quality where a black object stands out can be obtained.

Figure 15:
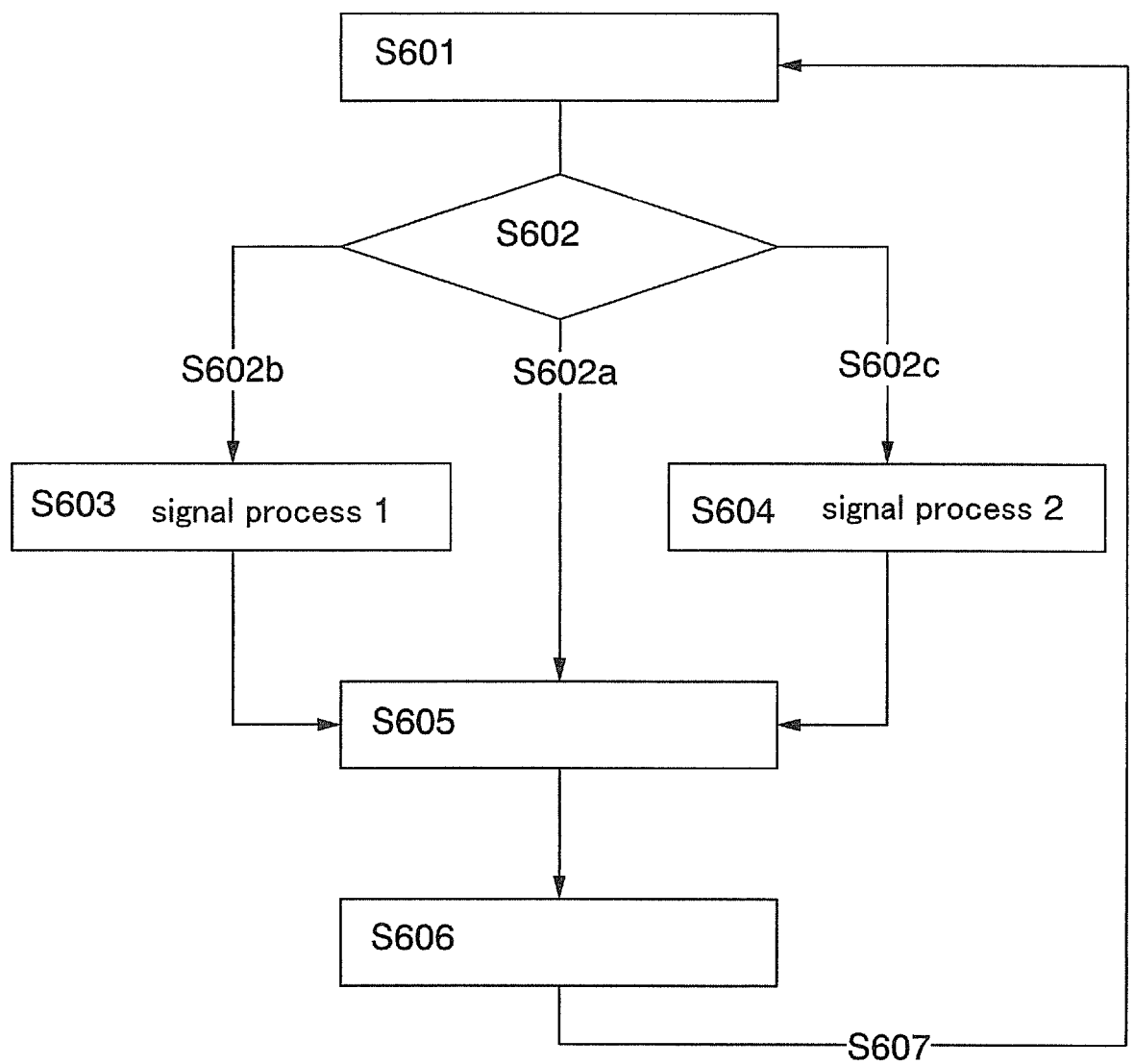
FIG. 15 is a flow chart showing a system of a light emitting device of the invention.

Description is made with reference to FIG. 13A using FIG. 15 on an operating method as a procedure to determine video signals and control a display device. First, when a video signal is inputted (S601), the video signal 101 supplied externally is inputted to the frame memory 180 included in the control circuit 102. Here, as described above, the frame memory 180 can store, for example, video signals for one frame.

After the frame memory 180 stores video signals for one frame, a selecting process (S602) is performed to select a ratio of a high grayscale region to a low grayscale region of the frame. By such a selecting process, the determining circuit 181 determines luminance distribution of the video signals. For example, as shown in FIG. 15, the determining circuit 181 determines which of three patterns corresponds to the case: (1) the case where the video signals are gently distributed in the intermediate grayscale region (S602a), (2) the case where the video signals are distributed separately into the high grayscale region and the low grayscale region and a ratio of the low grayscale region is higher than the ratio of the high grayscale region (high contrast and a ratio of black is high) (S602b), or (3) the case where the video signals are distributed separately into the high grayscale region and the low grayscale region and a ratio of the high grayscale region is higher than that of the low grayscale region (high contrast and a ratio of white is high) (S602c). As the determining standard of the determining circuit 181, a grayscale level of the high grayscale region, a grayscale level of the low grayscale region, a distribution ratio of each grayscale level, and the like may be preset as threshold values.

Based on the result of the determining circuit 181, the process is divided into three kinds of procedures as shown by S602a to S602c. In the case of the determination (1), no special process is carried out and an inputted video signal is inputted to the controller 109 as shown by S602a (S605). In the case of the determination (2), a signal process to display a high grayscale region at higher luminance is carried out by the converter circuit 182 (an addition process of a high grayscale region) (S603) as shown by S602b, and then inputted to the controller 109 (S605). In the case of the determination (3), a signal process to decrease the luminance of a whole screen is carried out by the converter circuit 182 (a whole subtraction process of a grayscale) (S604) as shown by S602c, and then inputted to the controller 109 (S605).

As a specific process, there is a method that luminance information of the video signal for the high grayscale region is added to data. In parallel to this addition process, subtraction of luminance information of the signal for the low grayscale region may be carried out so that the contrast is enhanced.

The video signals inputted to the controller 109 are rearranged or the like to an input order suitable for the specifications of the display device if required, and then inputted to the signal line driver circuit 103 and an image is displayed (S606).

By the aforementioned procedure, an operation of one frame is completed (S607). Hereafter, a similar operation is repeated from S601.

It is to be noted in this embodiment mode that the luminance of the high grayscale region or the low grayscale region is controlled by the addition/subtraction process of the video signals; however, a method for controlling a power source to control the pixel portion is also considered as another method.

For example, a method for displaying at higher luminance is suggested by setting a power source potential inputted to the pixel portion high without converting luminance information of the video signals for the high grayscale region.

By applying such a control to a liquid crystal display device, a high grayscale region is displayed at higher luminance by enhancing the luminance of a backlight. By enhancing the luminance of the backlight in this manner, light transmission (light leakage) in a low grayscale region or a black region is increased as well; therefore, subtraction of luminance information of video signals for the low grayscale region and the like may be carried out as well.

By applying such a control to a display device having a light emitting element in a pixel portion, a high luminance region is displayed at higher luminance by setting a power source potential high which supplies a current to the light emitting element as described above. At this time, subtraction of luminance information of the video signals for the low grayscale region is required to be carried out; however, this method is more effective as compared to the case of enhancing luminance of a backlight of a liquid crystal display device since there is no light leakage or the like of a region displaying "black".

Embodiment Mode 12

Figure 16:
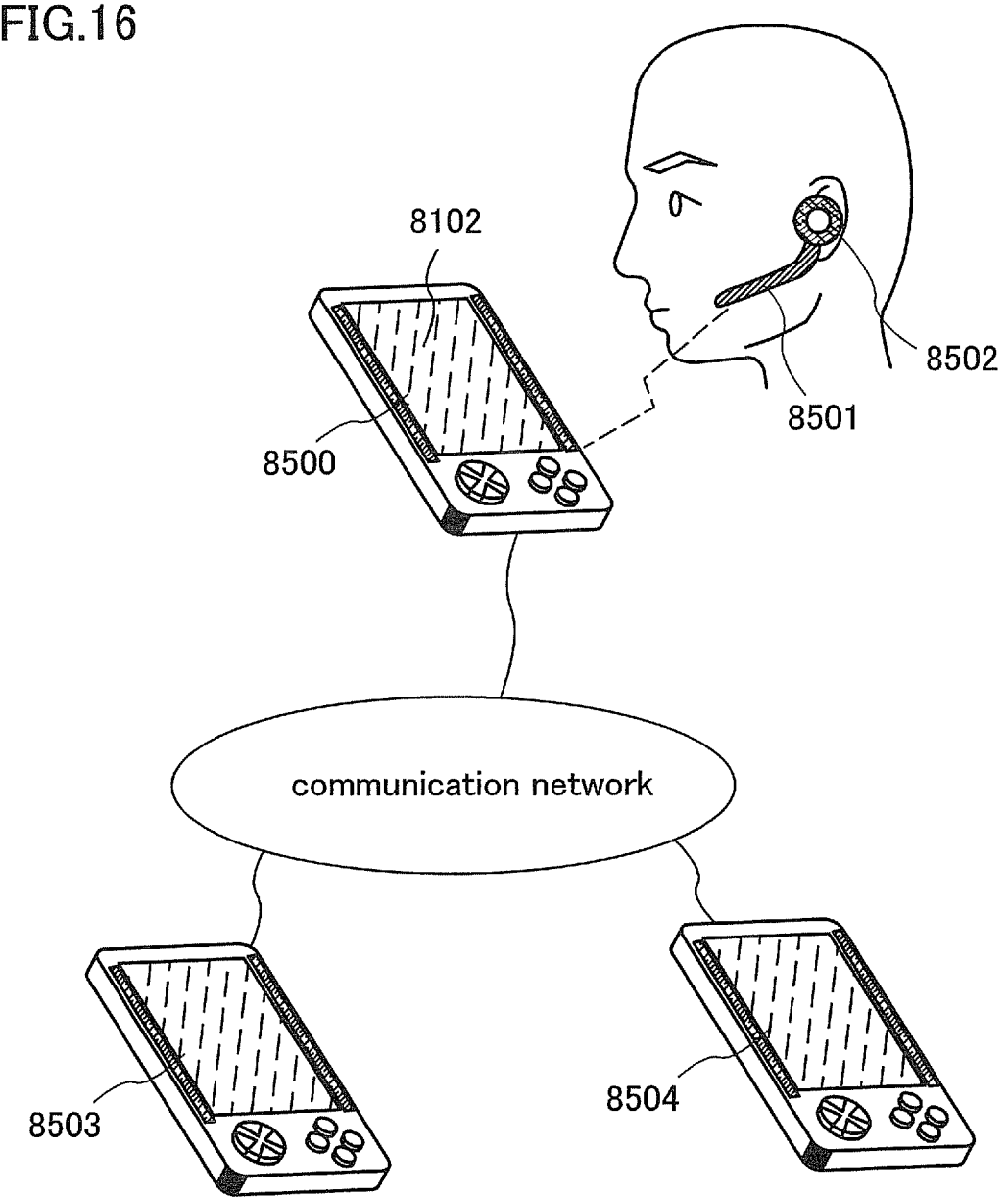
FIG. 16 is a view showing a communication type electronic device using the invention.

In this embodiment mode, an application mode of a game machine is described. FIG. 16 shows a game machine 8500 which incorporates a display device of the invention and a user who uses it. The user puts on an earphone microphone 8501 which is capable of communicating data with the game machine 8500 wirelessly (wireless communication). The earphone microphone is an audio input/output device in which a microphone and an earphone are integrated. A portion 8502 of the earphone microphone 8501 incorporates a circuit function and a charge function. The circuit function realizes a central processing unit (CPU), a memory, and an AD converter circuit and the charge function realizes a battery and the like. A portion or all of a circuit substrate for achieving these circuit function and charge function can be provided in an appropriate place of the earphone microphone 8501. As a memory function, a hard disk may be provided as well.

The earphone of the earphone microphone 8501 outputs audio which accompanies images displayed by the display method of the invention. As a result, a realistic sensation can further be improved.

Such audio is converted into an audio command by the central processing unit and the like in the game machine 8500 and transmitted to the earphone microphone 8501 through wireless communication. The earphone microphone 8501 which has received this converts the command into audio and sends it to the ear of the user.

Further, the microphone of the earphone microphone 8501 is inputted with the voice of the user. The central processing unit device provided in the earphone microphone 8501 can convert the voice into an audio command as well. The audio command can be then transmitted to the game machine 8500 through wireless communication to execute the command. For example, when the user says "sword", the word is inputted to the earphone microphone 8501 and converted into an audio command. When the game machine 8500 receives this through wireless communication, a program to show the "sword" on the screen can be executed. In this manner, the user can identify with a character in the game; thereby a realistic sensation can be improved.

Then, the game machine 8500 can access with game machines 8503 and 8504 of third parties through the communication network. The communication network is a wire communication when the volume of data such as the game contents is large whereas wireless communication is also possible if the volume of the data is allowed. As a result, the user can battle with people of all over the world who have the communication network. Such communication network preferably employs wire communication since the information of the game machine includes complicated images and audio, which are quite large volumes of data. It is needless to say that wireless communication can be used as the communication network depending on the volume of data and the progress of wireless communication technology.

The display device of the invention can be applied to the display portion 8102; thereby a grayscale of display can be effectively enhanced in accordance with game contents. As a result, a game machine capable of enhancing a realistic sensation can be provided. In this manner, the invention can increase the realistic sensation even when the function to see and the function to talk or listen are separated.

Such an audio identification function can be applied not only to the game machine but to, for example, a portable information processing device such as (Personal Digital Assistant) or an information communication device. In the portable information processing device or the information communication device, an email function, a still image reproducing function, and a moving image reproducing function are provided. A display method of the invention can be applied to the moving image reproducing function. These functions can be controlled in the number of grayscale levels in accordance with the purpose. For example, the email function requires only a mono-color display, and the still image reproducing function does not require such a high grayscale, for example, in the case of reproducing a book by an electronic book. Such a low grayscale display requires less number of rewriting operations; therefore, power consumption of a controller and a driver can be reduced. In particular, in the case where a natural image is not displayed, the number of grayscale levels is not required to be large; therefore, display can be performed giving a priority to the power consumption. In the case of the moving image reproducing function such as a firework, a clearer image of a firework can be provided by applying the display method of the invention, and further a talk function and a listen function can be separated from the display device. In this manner, an added value of a portable information processing device and an information communication device can be enhanced.

By providing a portable game machine, an information processing device, and an information communication device with a fingerprint sensor and the like, personal identification can be carried out. For example, the fingerprint sensor includes an optical type fingerprint sensor and a capacitor type fingerprint sensor. By using such a sensor function, an added value to the game machine, the information processing device, and the information communication device can be enhanced.

What is claimed is:

1. A semiconductor device including a pixel portion and a driver circuit portion, the semiconductor device comprising:
   a first substrate;
   a thin film transistor over the first substrate;
   a first electrode electrically connected to the thin film transistor;
   a light emitting layer over the first electrode, the light emitting layer comprising an organic compound;
   a second electrode over the first electrode so that the light emitting layer is disposed between the first electrode and the second electrode;
   a second substrate over the second electrode;
   a sealing material interposed between the first substrate and the second substrate;
   an insulating film over the second substrate; and
   a conductive layer on the insulating film,
   wherein the driver circuit portion includes a control circuit comprising a frame memory, a determining circuit, and a converter circuit for controlling a grayscale of an inputted video signal, and wherein the control circuit is configured to increase a luminance of a high grayscale region of the pixel portion and reduce a luminance of a low grayscale region of the pixel portion by lower voltage value supplied to the first electrode in the low grayscale region when the luminance of the high grayscale region is increased.

2. The semiconductor device according to claim 1, further comprising a second thin film transistor between the second substrate and the insulating film.

3. The semiconductor device according to claim 1, further comprising a second light emitting layer on the conductive layer.

4. The semiconductor device according to claim 1, further comprising a third substrate over the conductive layer.

5. The semiconductor device according to claim 4, further comprising a second sealing material interposed between the second substrate and the third substrate.

6. A game machine using the semiconductor device according to claim 1.

7. A semiconductor device including a pixel portion and a driver circuit portion, the semiconductor device comprising:
a first substrate;
a thin film transistor over the first substrate;
a light emitting element electrically connected to the thin film transistor, wherein the light emitting element comprises:
a first electrode;
a light emitting layer over the first electrode, the light emitting layer comprising an organic compound; and
a second electrode over the first electrode so that the light emitting layer is disposed between the first electrode and the second electrode;
a second substrate over the second electrode;
a sealing material interposed between the first substrate and the second substrate;
an insulating film over the second substrate; and
a conductive layer on the insulating film,
wherein the driver circuit portion includes a control circuit comprising a frame memory, a determining circuit, and a converter circuit, and
wherein the control circuit is configured to increase voltage value supplied to the first electrode of a first light emitting element in a high grayscale region of the pixel portion with reducing voltage value supplied to the first electrode of a second light emitting element in a low grayscale region of the pixel portion.

8. The semiconductor device according to claim 7, further comprising a second thin film transistor between the second substrate and the insulating film.

9. The semiconductor device according to claim 7, further comprising a second light emitting layer on the conductive layer.

10. The semiconductor device according to claim 7, further comprising a third substrate over the conductive layer.

11. The semiconductor device according to claim 10, further comprising a second sealing material interposed between the second substrate and the third substrate.

12. A game machine using the semiconductor device according to claim 7.

13. The semiconductor device according to claim 1,
wherein the frame memory is configured to store the inputted video signal for one frame,
wherein the determining circuit is configured to determine whether to perform a high grayscale display depending on a difference between the number of grayscale levels of the high grayscale region and that of the low grayscale region in the stored video signals; and
wherein the converter circuit is configured to increase a potential of the first electrode in the high grayscale region and to lower the potential of the first electrode in the low grayscale region.

14. The semiconductor device according to claim 1, wherein the high grayscale region is a white display region and the low grayscale region is a gray display region.

15. The semiconductor device according to claim 1, wherein the control circuit is configured to increase voltage value supplied to the first electrode of a first light emitting element in the high grayscale region of the pixel portion with reducing voltage value supplied to the first electrode of a second light emitting element in the low grayscale region of the pixel portion.

16. The semiconductor device according to claim 15, wherein the high grayscale region is a white display region and the low grayscale region is a gray display region.

17. The semiconductor device according to claim 7,
wherein the frame memory is configured to store an inputted video signal for one frame,
wherein the determining circuit is configured to determine whether to perform a high grayscale display depending on a difference between the number of grayscale levels of the high grayscale region and that of the low grayscale region in the stored video signals, and
wherein the converter circuit is configured to control increase a potential of the first electrode of the light emitting element in the high grayscale region and to lower the potential of the first electrode of the light emitting element in the low grayscale region so that more current is supplied to the light emitting element in the high grayscale region and smaller current is supplied to the light emitting element in the low grayscale region when the determining circuit determines to perform the high grayscale display is performed.

18. The semiconductor device according to claim 7, wherein the control circuit is configured to increase a luminance of the high grayscale region of the pixel portion and reduce a luminance of the low grayscale region of the pixel portion by lower voltage value supplied to the first electrode in the low grayscale region when the luminance of the high grayscale region is increased.

19. The semiconductor device according to claim 18, wherein the high grayscale region is a white display region and the low grayscale region is a gray display region.

20. The semiconductor device according to claim 7, wherein the high grayscale region is a white display region and the low grayscale region is a gray display region.

* * * * *